(12) United States Patent
Dominguez et al.

(10) Patent No.: US 7,707,120 B2
(45) Date of Patent: Apr. 27, 2010

(54) MOBILE ACCOUNT AUTHENTICATION SERVICE

(75) Inventors: Benedicto H. Dominguez, San Bruno, CA (US); Thomas J. Manessis, Pacifica, CA (US); Janet T. Roth, Oakland, CA (US); Pascal Achille Caillon, San Francisco, CA (US); Jason Spielman, Austin, TX (US); Terence Spielman, Austin, TX (US); James Donald Reno, Scotts Valley, CA (US)

(73) Assignee: Visa International Service Association, Foster City, CA (US)

( * ) Notice: Subject to any disclaimer, the term of this patent is extended or adjusted under 35 U.S.C. 154(b) by 1459 days.

(21) Appl. No.: 10/370,149

(22) Filed: Feb. 19, 2003

(65) Prior Publication Data

US 2003/0200184 A1  Oct. 23, 2003

Related U.S. Application Data

(60) Provisional application No. 60/373,702, filed on Apr. 17, 2002, provisional application No. 60/405,869, filed on Aug. 23, 2002.

(51) Int. Cl.
*G06F 17/60* (2006.01)

(52) U.S. Cl. .............................. 705/78; 705/30; 705/67; 705/64

(58) Field of Classification Search .................. 705/78, 705/30, 67, 64
See application file for complete search history.

(56) References Cited

U.S. PATENT DOCUMENTS

| 5,163,098 A | 11/1992 | Dahbura |
| 5,267,315 A | 11/1993 | Narita et al. |
| 5,420,926 A | 5/1995 | Low et al. |
| 5,442,342 A | 8/1995 | Kung |
| 5,485,510 A | 1/1996 | Colbert |
| 5,544,322 A | 8/1996 | Cheng et al. |

(Continued)

FOREIGN PATENT DOCUMENTS

AU        2001259080        10/2001

(Continued)

OTHER PUBLICATIONS

Weller et al., "Online Payer Authentication Service," U.S. Appl. No. 09/842,313, filed Apr. 24, 2001, 69 pages.

(Continued)

*Primary Examiner*—Pierre E Elisca
(74) *Attorney, Agent, or Firm*—Beyer Law Group LLP

(57) ABSTRACT

A payment authentication service authenticates the identity of a payer during online transactions. The authentication service allows a card issuer to verify a cardholder's identity using a variety of authentication methods, such as with the use of tokens. Authenticating the identity of a cardholder during an online transaction involves querying an access control server to determine if a cardholder is enrolled in the payment authentication service, requesting a password from the cardholder, verifying the password, and notifying a merchant whether the cardholder's authenticity has been verified. Systems for implementing the authentication service in which a cardholder uses a mobile device capable of transmitting messages via the Internet are described. Systems for implementing the authentication service in which a cardholder uses a mobile device capable of transmitting messages through voice and messaging channels is also described.

50 Claims, 18 Drawing Sheets

Core Account
Authentication
System Architecture

U.S. PATENT DOCUMENTS

| | | | |
|---|---|---|---|
| 5,671,279 A | | 9/1997 | Elgamal |
| 5,684,950 A | | 11/1997 | Dare et al. |
| 5,712,913 A | | 1/1998 | Chaum |
| 5,778,065 A | | 7/1998 | Hauser et al. |
| 5,793,028 A | * | 8/1998 | Wagener et al. ............. 235/380 |
| 5,815,665 A | | 9/1998 | Teper et al. |
| 5,826,241 A | | 10/1998 | Stein et al. |
| 5,826,245 A | | 10/1998 | Sandberg-Diment |
| 5,835,896 A | | 11/1998 | Fisher et al. |
| 5,845,070 A | | 12/1998 | Ikudome |
| 5,845,265 A | | 12/1998 | Woolston |
| 5,883,810 A | | 3/1999 | Franklin et al. |
| 5,884,272 A | | 3/1999 | Walker et al. |
| 5,903,721 A | | 5/1999 | Sixtus |
| 5,903,878 A | | 5/1999 | Talati et al. |
| 5,903,882 A | | 5/1999 | Asay et al. |
| 5,909,492 A | | 6/1999 | Payne et al. |
| 5,970,475 A | | 10/1999 | Barnes et al. |
| 5,991,738 A | | 11/1999 | Ogram |
| 5,999,596 A | | 12/1999 | Walker et al. |
| 6,016,476 A | | 1/2000 | Maes et al. |
| 6,029,141 A | | 2/2000 | Bezos et al. |
| 6,047,268 A | | 4/2000 | Bartoli et al. |
| 6,052,675 A | | 4/2000 | Checchio |
| 6,070,241 A | | 5/2000 | Edwards et al. |
| 6,076,078 A | | 6/2000 | Camp et al. |
| 6,078,902 A | | 6/2000 | Schenkler |
| 6,098,053 A | | 8/2000 | Slater |
| 6,122,624 A | | 9/2000 | Tetro et al. |
| 6,167,378 A | | 12/2000 | Webber, Jr. |
| 6,202,051 B1 | | 3/2001 | Woolston |
| 6,205,437 B1 | | 3/2001 | Gifford |
| 6,236,981 B1 | | 5/2001 | Hill |
| 6,243,691 B1 | | 6/2001 | Fisher et al. |
| 6,260,024 B1 | | 7/2001 | Shkedy |
| 6,327,578 B1 | * | 12/2001 | Linehan ........ 705/65 |
| 6,381,316 B2 | | 4/2002 | Joyce et al. |
| 6,427,132 B1 | | 7/2002 | Bowman-Amuah |
| 6,629,081 B1 | | 9/2003 | Cornelius et al. |
| 6,704,714 B1 | | 3/2004 | O'Leary et al. |
| 6,735,572 B2 | | 5/2004 | Landesmann |
| 6,820,202 B1 | | 11/2004 | Wheeler et al. |
| 6,839,692 B2 | | 1/2005 | Carrott et al. |
| 6,879,965 B2 | | 4/2005 | Fung et al. |
| 6,889,325 B1 | | 5/2005 | Sipman et al. |
| 6,931,382 B2 | | 8/2005 | Laage et al. |
| 6,938,019 B1 | | 8/2005 | Uzo |
| 6,941,285 B2 | * | 9/2005 | Sarcanin ........ 705/67 |
| 7,177,838 B1 | | 2/2007 | Ling |
| 7,177,849 B2 | | 2/2007 | Fieschi et al. |
| 7,249,093 B1 | | 7/2007 | King |
| 7,318,048 B1 | | 1/2008 | King |
| 2001/0014158 A1 | | 8/2001 | Baltzley |
| 2001/0029496 A1 | | 10/2001 | Otto et al. |
| 2001/0039535 A1 | | 11/2001 | Tsiounis et al. |
| 2001/0044787 A1 | | 11/2001 | Shwartz et al. |
| 2001/0054003 A1 | | 12/2001 | Chien et al. |
| 2002/0007352 A1 | | 1/2002 | Fieschi et al. |
| 2002/0019811 A1 | | 2/2002 | Lapsley et al. |
| 2002/0023059 A1 | | 2/2002 | Bari et al. ............. 731/201 |
| 2002/0069174 A1 | | 6/2002 | Fox et al. |
| 2002/0091646 A1 | | 7/2002 | Lake et al. |
| 2002/0128977 A1 | | 9/2002 | Nambiar et al. |
| 2002/0169720 A1 | | 11/2002 | Wilson et al. |
| 2003/0097451 A1 | | 5/2003 | Bjorksten et al. |
| 2003/0120615 A1 | | 6/2003 | Kuo |
| 2003/0144952 A1 | | 7/2003 | Brown et al. |
| 2003/0200184 A1 | | 10/2003 | Dominguez et al. |
| 2003/0208684 A1 | | 11/2003 | Camacho et al. |
| 2003/0212642 A1 | | 11/2003 | Weller et al. |
| 2004/0044627 A1 | | 3/2004 | Russell et al. |
| 2004/0078328 A1 | | 4/2004 | Talbert et al. |
| 2004/0083184 A1 | | 4/2004 | Tsuei et al. |
| 2004/0177047 A1 | | 9/2004 | Graves et al. |
| 2004/0230536 A1 | | 11/2004 | Fung et al. |
| 2004/0243520 A1 | | 12/2004 | Bishop et al. |
| 2005/0065855 A1 | | 3/2005 | Geller |
| 2005/0131826 A1 | | 6/2005 | Cook |
| 2005/0192896 A1 | | 9/2005 | Hutchison et al. |
| 2006/0269061 A1 | * | 11/2006 | Balasubramanian et al. 380/247 |
| 2008/0046362 A1 | * | 2/2008 | Easterly ........ 705/40 |
| 2009/0198618 A1 | * | 8/2009 | Chan et al. ........ 705/66 |

FOREIGN PATENT DOCUMENTS

| | | |
|---|---|---|
| AU | 2002215278 | 6/2002 |
| EP | 0 896 284 | 2/1999 |
| EP | 0 896 284 A | 2/1999 |
| EP | 1 271 435 A2 | 1/2003 |
| JP | 11-43780 | 11/1997 |
| JP | 10-313488 | 4/1998 |
| JP | 2000-184085 | 12/1998 |
| JP | 2000-236353 | 11/1999 |
| JP | 2001-313979 | 4/2000 |
| JP | 2001-344550 | 6/2000 |
| JP | 2000-142398 | 9/2000 |
| JP | 2003-586704 | 2/2001 |
| JP | 2001-291032 | 3/2001 |
| JP | 2002-91473 | 6/2001 |
| JP | 2002245243 A * | 8/2002 |
| WO | WO 92/11598 | 7/1992 |
| WO | WO 99/42961 | 8/1999 |
| WO | WO 99/42961 A | 8/1999 |
| WO | WO 99/46881 | 9/1999 |
| WO | 00 67143 | 4/2000 |
| WO | WO 00/67143 | 11/2000 |
| WO | WO 01/07873 A2 | 2/2001 |
| WO | WO 01/13275 | 2/2001 |
| WO | WO 01/13275 A1 | 2/2001 |
| WO | 01 78493 A2 | 4/2001 |
| WO | 01 82190 | 4/2001 |
| WO | WO 01/37180 | 5/2001 |
| WO | WO 01/48628 | 7/2001 |
| WO | WO 01/63878 A1 | 8/2001 |
| WO | WO 01/67201 A2 | 9/2001 |
| WO | WO 01/69549 A1 | 9/2001 |
| WO | WO 01/78493 A | 10/2001 |
| WO | WO 01/78493 A2 | 10/2001 |
| WO | WO 01/99378 A | 12/2001 |
| WO | WO 02/03285 | 1/2002 |
| WO | WO 02/03285 A1 | 1/2002 |
| WO | WO 02/21464 | 3/2002 |
| WO | WO 03/107242 A1 | 12/2003 |
| WO | WO 2004/079603 | 9/2004 |

OTHER PUBLICATIONS

Dominguez et al., "Online Account Authentication Service," U.S. Appl. No. 10/156,271, filed May 24, 2002, 75 pages.

Dominguez et al., "Data Authentication and Provisioning Method and System," U.S. Appl. No. 10/660,263, filed Sep. 10, 2003, 26 pages.

Gerber et al., "Multiple Party Benefit from an Online Authentication Service," U.S. Appl. No. 10/838,719, filed May 3, 2004, 67 pages.

Novell Debuts New Digitalme in the Net, Oct. 6, 1999, http://www.digitalme.com.

Supplementary European Search Report; Dated Mar. 31, 2005; European Patent Apl. No. 03726334.0.

Prince, "Online Auctions at eBay" (Apr. 1999). Prima Publishing Rocklin, CA.

eBay. (Nov. 3, 1999). http://web.archive.org/web/I9991103051532/http://www.ebay.com/. Retrieved online Aug. 18, 2004.

O'Mahony, Donald et al. "Electronic Payment Systems." 1997 ARTECH House Inc., Norwood, MA.

eBay. (Nov. 3, 1999). http://web.archive.org/web/19991103051532/http://www.ebay.com/. Retrieved online Aug. 18, 2004.
United States District Court for the Northern District of Texas; Civil Action No. CIV 3-03CV0976-L; "Defendants' Preliminary Invalidity Contentions"; Starpay.com, L.L.C., Plaintiffs vs. Visa International Service Associate and Visa U.S.A. Inc., Defendants; May 28, 2004.
Linn, "Practical Authentication for Distributed Computing," May 7-9, 1999, 1999 IEEE Computer Society Symposium on Research in Security and Privacy, Oakland, CA.
Novell Debuts New Digitalme in the Net, Oct. 6, 1999; http://www.digitalme.com.
U.S. Appl. No. 60/165546 and 60/165547.
Korean Patent Abstract; Publication No. 1020000012391 A; Mar. 6, 2000.
Office Action; U.S. Appl. No. 09/842,313; dated Nov. 10, 2004.
Office Action; U.S. Appl. No. 09/842,313; dated Aug. 3, 2005
Office Action; U.S. Appl. No. 09/842,313; dated Mar. 10, 2006.
Office Action; U.S. Appl. No. 09/842,313; dated Oct. 4, 2006.
Office Action; U.S. Appl. No. 10/156,271; dated Aug. 23, 2004
Office Action; U.S. Appl. No. 10/156,271; dated Feb. 11, 2005.
Office Action; U.S. Appl. No. 10/156,271; dated Jun. 24, 2005.
Office Action; U.S. Appl. No. 10/156,271; dated Dec. 20, 2006.
Office Action; U.S. Appl. No. 10/156,271; dated Aug. 23, 2007.
Office Action; U.S. Appl. No. 10/384,735; dated Aug. 10, 2007.
Office Action; U.S. Appl. No. 10/660,263; dated Jan. 24, 2005.
Office Action; U.S. Appl. No. 10/660,263; dated Jul. 20, 2005.
Office Action; U.S. Appl. No. 10/660,263; dated Feb. 10, 2006.
Office Action; U.S. Appl. No. 10/660,263; dated Jul. 31, 2006.
Office Action; U.S. Appl. No. 10/660,263; dated May 18, 2007.
Office Action; U.S. Appl. No. 10/838,719; dated Oct. 24, 2005.
Office Action; U.S. Appl. No. 10/838,719; dated Apr. 7, 2006.
Office Action; U.S. Appl. No. 10/838,719; dated Nov. 7, 2006.
Office Action; U.S. Appl. No. 10/838,719; dated Jul. 26, 2007.
Office Action dated Jul. 17, 2008 in U.S. Appl. No. 10/838,719.
Office Action dated Feb. 12, 2008 in U.S. Appl. No. 10/156,271.
Office Action dated Sep. 5, 2008 in U.S. Appl. No. 10/660,263.
Office Action dated Dec. 11, 2007 in U.S. Appl. No. 10/370,149.
J. Kohl and C. Neuman; "The Kerberos Network Authentication Service (V5)," Sep. 1993; pp. 1-10, URL: http://www.ietf.org/rfc1510.txt downloaded on Apr. 29, 2008..
Search Report from corresponding Singapore Application No. 200701817-9, mailed Jun. 23, 2008.
Written Opinion from corresponding Singapore Application 2007/01817-9, mailed Jun. 23, 2008.
Office Action dated Jan. 22, 2009 in U.S. Appl. No. 10/156,271.
Office Action dated Mar. 9, 2009 in U.S. Appl. No. 10/370,149.
Office Action dated Nov. 17, 2008 in U.S. Appl. No. 10/660,263.
Office Action dated May 13, 2009 in U.S. Appl. No. 10/838,719.
Office Action dated Jul. 14, 2008 in U.S. Appl. No. 10/838,719.
Office Action dated Feb. 6, 2009 in U.S. Appl. No. 10/838,719.
Office Action dated Sep. 12, 2008 in Patent Application No. 2003228574 AU.
Office Action dated Dec. 24, 2008 Patent Application No. 2004-80039179.6 CN.
Office Action dated Apr. 18, 2007 Patent Application No. 2006-03488-8 SG.
Office Action dated Feb. 10, 2009 Patent Application No. 2003-586704;JPO.
Office Action dated Nov. 10, 2009 Patent Application No. 2002-7014247; KR.
"Chambers"; Retrieved Nov. 3, 2008, 1pg. from http://www.credoreference.com/entry/1196447/.
European Extended Search Report; Application No. 09150401.9-1238; Apr. 9, 2009.
Office Action dated Jun. 5, 2009 in U.S. Appl. No. 09/842,313.
Office Action dated Jun. 17, 2009 in U.S. Appl. No. 12/034,606.
Mexican Office Action dated May 15, 2009; Application No. PA/A/2006/006158.
Translation of Mexican Office Action dated May 15, 2009; App No. PA/A2006/006158.
Office Action dated Nov. 10, 2008 Patent Application No. 2002-7014247; KR.
Office Action dated Aug. 28, 2009 in the U.S. Appl. No. 10/660,263.
Office Action dated Aug. 17, 2009 in the U.S. Appl. No. 10/156,271.
Office Action dated Jun. 7, 2009 in the U.S. Appl. No. 12/034,606.
Exhibit BB-15 to the stautory declaration of Bahram Boutorahi; Jan. 25, 2001.
Exhibit BB-16 to the stautory declaration of Bahram Boutorahi; Jan. 25, 2001.
Exhibit BB-18 to the stautory declaration of Bahram Boutorahi; Feb. 7, 2000.
Exhibit BB-19 to the stautory declaration of Bahram Boutorahi; Apr. 16, 2002.
Exhibit BB-20 to the stautory declaration of Bahram Boutorahi; May 2, 2002.
Exhibit BB-21 to the stautory declaration of Bahram Boutorahi; May 21, 2002.
Exhibit BB-22 to the stautory declaration of Bahram Boutorahi; Feb. 13, 2002.
Exhibit BB-23 to the stautory declaration of Bahram Boutorahi; Apr. 7, 2009.
Exhibit BB-24 to the stautory declaration of Bahram Boutorahi; Oct. 27, 1999.
Australian Opposition; "Statement of Grounds of Opposition and Particular Relating to Each Ground"; Oct. 10, 2008; pp. 1-10.
Exhibit BB-4 to the stautory declaration of Bahram Boutorahi; Jan. 27, 2009.
Exhibit BB-5 to the stautory declaration of Bahram Boutorahi; Jan. 27, 2009.
Exhibit BB-6 to the stautory declaration of Bahram Boutorahi; Jan. 27, 2009.
Exhibit BB-7 to the stautory declaration of Bahram Boutorahi; Jan. 27, 2009.
Exhibit BB-8 to the stautory declaration of Bahram Boutorahi; Jan. 27, 2009.
Commonwealth of Australin Statutory Declaration of Bahram Boutorahi, Apr. 7, 2009.
Commonwealth of Australia Statutory Declearation of Andrew Weller; Apr. 6, 2009.
Leach, "Dynamic Authentication for Smartcards," 1995, Computers & Security, vol. 14, No. 5, pp. 385-389.
Ganesan, "The Vaksha Security System," Mar. 1996, Comminications of the ACM, vol. 39, No. 3, pp. 55-60.
Zhou et al., "A Fair Non-Repudiation Protocol," May 6-8, 1996, 1996 IEEE Symposioum on Security and Privacy, pp. 55-61, Oakland, CA.
Bakker, "Mutual Authentication with Smart Cards," May 10-11, 1999, Proceedings of the USENIX Workshop on Smartcard Technology (Smartcard '99), pp. 63-74, Chicago, Illinois.
http://www.orbiscom.com, Jun. 30, 2000.
Sherman et al., "Secure Network Access Using Multiple Applications of AT&T's Smart Card," Sep./Oct. 1994, AT&T Technical Journal.
Supplementary European Search Report; Feb. 9, 2006; PCT/US 0328599.
International Search Report; PCT/US 03/28599.

* cited by examiner

Core Account
Authentication
System Architecture

System Architecture for Payment Transactions

Account Holder Registration

Registration Page

Last 3 Digits of Account Number :

Security Information

Name :

City :

State :    ZIP:

Mother's Maiden Name :

Last 4 Digits of SSN :

List of Banks

Name on Card :

FIG. 4

Payment Transaction on Core Account Authentication System

Payment Transaction
Cardholder Password
Prompt

System Architecture for Payment Transaction: Message Detail

Purchase Transaction
for Core Account Authentication System

Purchase Transaction Supporting
Mobile Internet Devices

| Field Name | PAReq Tag | CPRQ Tag | Maximum Size |
|---|---|---|---|
| Message Version Number | version | version | as required in core protocol |
| Acquirer BIN | Merchant.acqBIN | ab | 11 |
| Merchant ID | Merchant.merID | mi | 24 |
| Merchant Name | Merchant.name | n | 25 |
| Merchant Country Code | Merchant.country | c | 3 |
| Merchant URL | Merchant.url | mu | 256 |
| Transaction Identifier | Purchase.xid | xi | 28 |
| Purchase Date & Time | Purchase.date | d | 17 |
| Display Amount | Purchase.amount | a | 20 |
| Purchase Amount | Purchase.purchAmount | pa | 12 |
| Purchase Currency | Purchase.currency | r | 3 |
| Currency Exponent | Purchase.exponent | e | 1 |
| Recurring Frequency | Purchase.Recur.frequency | rf | 3 |
| Recurring Expiry | Purchase.Recur.endRecur | er | YYYYMMDD |
| Installment Payment Data | Purchase.Install | ip | 3 |
| Account Identifier | CH.acctID | ai | 28 |
| Card Expiry Date | CH.expiry | ex | 4 |
| Message Extension | Extension | Ext | |

FIG. 10
CPRQ Fields

| CPRS elements | | | |
|---|---|---|---|
| Field Name | PARes Tag | CPRS Tag | Maximum Size |
| Message Version Number | version | version | as required in core protocol |
| Transaction Identifier | Purchase.xid | xi | 28 |
| Cardholder PAN | pan | pn | 19 |
| Signature Date & Time | TX.time | xt | 17 |
| Transaction Status | TX.status | xs | 1 |
| Cardholder Authentication Verification Value | TX.cavv | xc | 28 |
| Electronic Commerce Indicator | TX.eci | xe | 2 |
| CAVV Algorithm | TX.cavvAlgorithm | xa | 1 |
| Invalid Request Code | IReq.iReqCode | ic | 2 |
| Invalid Request Detail | IReq.iReqDetail | it | 30 |
| Vendor Code | IReq.vendorCode | xv | 256 |
| Signature Value | SignatureValue | s | 172 |
| Message Extension | Extension | Ext | |

FIG. 11
CPRS Fields

Purcahse Transaction Supporting
Mobile Non-Internet Capable
Devices

Message Exhange without Proxy Servers

Message Exchange with Proxy Servers

Two-Way
Messaging System

Integrated Payment Systems

MOBILE ACCOUNT AUTHENTICATION SERVICE

CROSS-REFERENCE TO RELATED APPLICATIONS

This application claims priority of U.S. provisional patent application No. 60/373,702, filed Apr. 17, 2002, entitled "THREE DOMAIN SECURE PROTOCOL," and of U.S. Provisional patent application No. 60/405,869, filed Aug. 23, 2002, entitled "MOBILE ACCOUNT AUTHENTICATION SERVICE," each of which are hereby incorporated by reference.

This application is related to U.S. patent application Ser. No. 10/156,271, filed May 24, 2002, and entitled "ONLINE ACCOUNT AUTHENTICATION SERVICE," which is a continuation-in-part to U.S. patent application Ser. No. 09/842,313 filed Apr. 24, 2001, entitled "On-Line Payer Authentication Service," which in turn claims priority of U.S. provisional patent application No. 60/199,727, filed Apr. 24, 2000 entitled "Visa Payer Authentication Service Description," all of which are hereby incorporated by reference.

FIELD OF THE INVENTION

The present invention relates generally to mobile electronic transactions, and more specifically to authenticating the identity of account holders during mobile transactions.

BACKGROUND OF THE INVENTION

During a payment transaction using a payment card (e.g., a credit, debit, or stored value card), it is important to verify a cardholder's ownership of an account to avoid a variety of problems, such as unauthorized use. Payer authentication is the process of verifying a cardholder's ownership of an account. The most common method to authenticate a cardholder's ownership of an account occurs routinely at a point of sale during what is called a "card present" transaction. A card present transaction involves a merchant's representative taking the cardholder's card, swiping it though a payment card terminal to verify account status and credit line availability, and then checking to see that the signature on the back of the card matches the purchaser's signature. Comparison of the signatures provides authentication of account ownership. If the merchant follows specific guidelines for this type of transaction, the merchant will be guaranteed payment for the amount authorized less discount and fees. A service provider such as Visa International Service Association (or another service organization) may provide these specific guidelines.

"Card not present" transactions, on the other hand, such as those occurring online, through mobile devices, through the mail, or over the telephone, involve payments that are not guaranteed to the merchant. Online transactions include those that are conducted, for example, over the Internet. No guarantee is provided primarily because the payers are not authenticated in such non face-to-face transactions, thereby allowing many risks to accompany the "card not present" transactions. Such risks involve issues such as chargebacks of payment transactions to online merchants, fraud for both merchants and cardholders, increased exception item processing expenses for banks, and an increased perception that buying goods and services online or through mobile devices is not safe and secure, which may keep some consumers from buying online. Other examples of risks include the unauthorized use of stolen account information to purchase goods and services online, fabrication of card account numbers to make fraudulent online purchases, and extraction of clear text account information from network traffic.

Given the continued expected high growth of electronic commerce, it is important to provide methods to authenticate payers. This will benefit all payment system participants including cardholders, merchants, and financial institutions. Authenticating the payer during online payment transactions will reduce the levels of fraud, disputes, retrievals and chargebacks, which subsequently will reduce the costs associated with each of these events. Authenticating the payer also addresses consumer security concerns and therefore will lead to increased sales made online or through mobile devices. Prior systems used to authenticate consumers during online transactions have not been widely adopted because these systems were difficult to use, had complex designs, required significant up-front investment by system participants and lacked interoperability. Certain prior systems additionally required the creation, distribution and use of certificates by merchants, cardholders, issuers and acquirers. Such use of certificates is known to be quite burdensome.

In view of the foregoing, a system for authenticating the identity of the payer in an online or mobile transaction would be desirable. Such an authenticating system should be relatively easy to implement and use, require a minimal investment of resources, and provide a high level of interoperability between the system's participants.

BRIEF SUMMARY OF THE INVENTION

The present invention is directed towards techniques for authenticating the identity of an account holder during online and mobile transactions. The present invention is relatively easy to implement and use, requires a minimal investment of resources to implement, and provides a high level of interoperability between the system's participants. The authentication service of the present invention allows a trusted party to verify an account holder's identity using a variety of authentication techniques, such as passwords and tokens. The authentication service can also provide authentication results to the merchant in real time during the checkout process. The present invention provides processes and systems to implement the authentication service when an account holder accesses the service using mobile devices. These processes and systems support mobile devices that send messages over the Internet, voice channels, and text messaging channels.

One aspect of the invention pertains to a method for authenticating the identity of an account holder wherein the account holder uses a mobile device capable of receiving and transmitting messages over the Internet. This method involves establishing a communication connection between a requesting party and the account holder in order to conduct the transaction, creating a condensed payment authentication response message (CPRS) at the trusted party, transmitting the CPRS to the requesting party via the account holder, retrieving a first set of data fields from a memory device located at the requesting party, constructing a complete CPRS at the requesting party by combining the condensed CPRS with the first set of data fields, and authorizing the transaction between the account holder and requesting party when the complete CPRS indicates that the identity of the account holder is authenticated.

A second aspect of the invention pertains to a system for supporting the method described just prior. Such a system includes a merchant server configured to communicate with the account holder in order to process the transaction, an access control server controlled by the trusted party, the access control server configured to create a condensed CPRS, and a merchant plug-in software module having a merchant memory unit, the merchant plug-in module configured to receive the condensed CPRS, to retrieve a first set of data fields from the merchant memory unit, and to construct a complete CPRS by combining the condensed CPRS with the first set of data fields.

A third aspect of the invention pertains to a method for authenticating the identity of an account holder wherein the account holder uses a mobile device capable of receiving and transmitting voice and/or text messages. This method involves establishing and conducting a transaction between an account holder and a requesting party over a first voice or messaging channel, sending a payment authentication request message (PAReq) from the requesting party to the trusted party over the Internet, establishing a connection between the account holder and the trusted party over a second voice or messaging channel, and transmitting an authenticating token from the account holder to the trusted party over the second voice or messaging channel.

Yet another aspect of the present invention pertains to a system capable of supporting the method described just prior. This system includes a merchant server configured to communicate with the account holder in order to process the transaction, a merchant plug-in software module, a first HTML form containing the payer authentication request message that is posted over the Internet to the trusted party from the merchant plug-in software module, a first voice or messaging channel established between the merchant server and the account holder, wherein the first voice or messaging channel is used to conductor the transaction, an access control server controlled by the trusted party, a second voice or messaging channel established between the account holder and the access control server, and an authenticating token that is transmitted from the account holder to the access control server over the second voice or messaging channel, the authenticating token configured to be used by the access control server to authenticate the identity of the account holder.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which:

FIG. 4 illustrates one embodiment of an Internet web page in which an account holder can enter information during the account authentication system enrollment process.

FIG. 10 illustrates a table that includes the data fields that make up the Condensed Payer Authentication Request message according to one embodiment.

FIG. 11 illustrates a table that includes the data fields that make up the Condensed Payer Authentication Response message according to one embodiment.

DETAILED DESCRIPTION OF THE INVENTION

Figure 1:
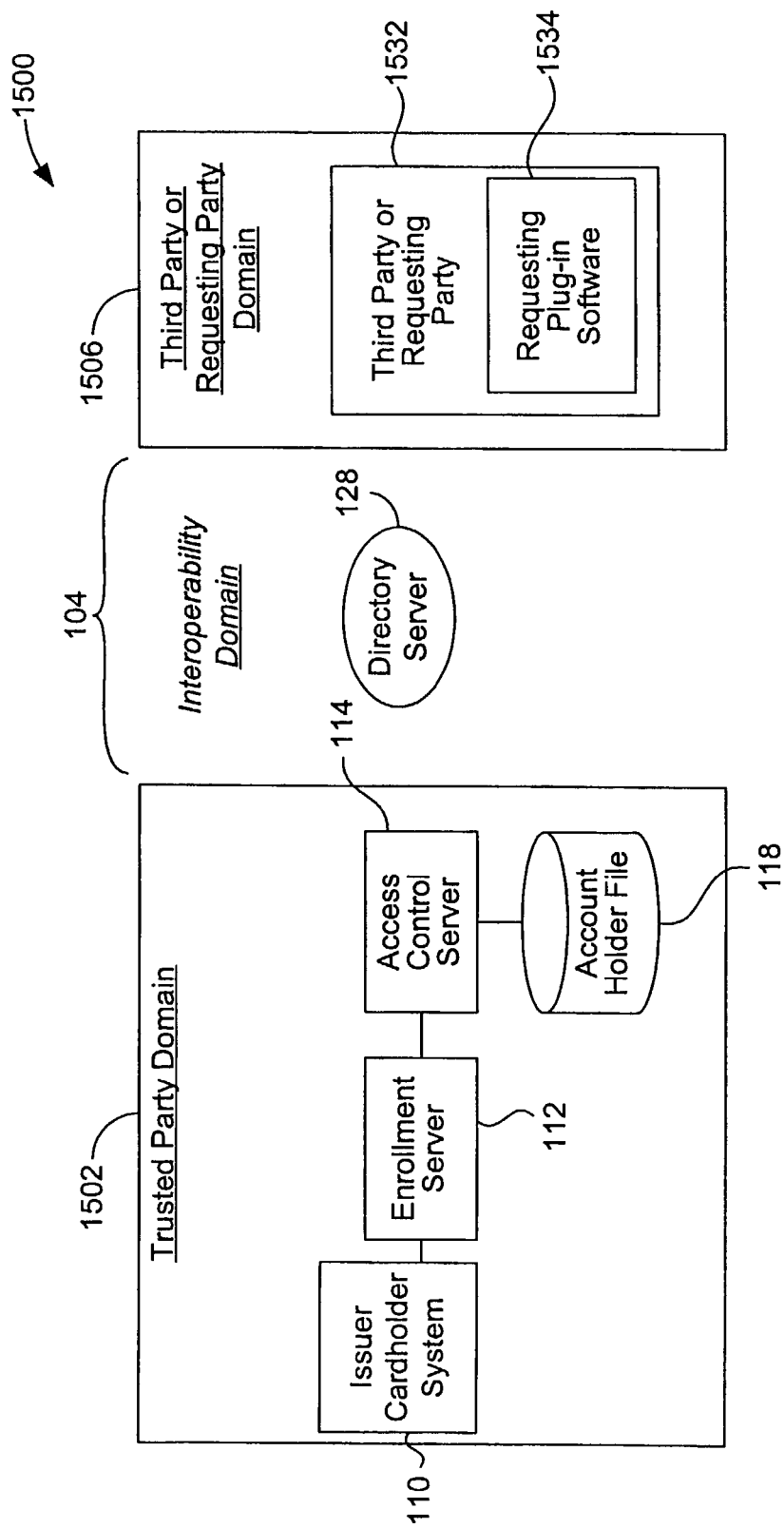
FIG. 1 illustrates one embodiment of a core system architecture for implementing the account authentication service of the present invention for various types of account authentication applications.

The present invention will now be described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The present description will begin with an overview of a core account authentication system and protocol. The account authentication system is provided as a service to participating issuers, account holders, and merchants. An implementation of the core account authentication system relating to online payment transactions is first described. The description of online payment transactions provides details about the authentication system and protocol that are analogous to the authentication system and protocol used for non-payment transactions. This is because both payment and non-payment transactions involve the authentication of an account holder's identity. The description of online payment transactions covers the payment transaction itself, system setup, customer registration, and specific message flows. Variations of the account authentication system are described following the description of the core account authentication system and protocol. The alternative implementations allow account holders or consumers to use mobile devices such as Internet compatible and Internet non-compatible devices. The core account authentication system forms the basis for the mobile device implementations.

Account Authentication System for Various Implementations

The account authentication system is designed to authenticate cardholder account ownership during transactions in which one party cannot physically verify the identity of another party who purports to be the owner of a specific account. For example, the account authentication system can be used in various transactions when a trusted party authenticates the identity of an individual or entity for the benefit of a third party. As is commonly known, the trusted party usually accepts legal responsibility for the authentication of the individual or entity to the third party. Certainly, one important application of the system is in the field of payment transactions that take place either online or over portable electronic devices.

However, the system can be useful in many applications aside from payment transactions. For example, non-payment transactions include transactions such as authenticating a financial institution's customer when a consumer accesses an Internet web site to complete an online form. Non-payment transactions also include many aspects of retail banking, wholesale banking, medical businesses, insurance businesses, and brokerage businesses, just to mention a few. Retail banking involves account numbers used with cards such as debit cards, purchase cards, and stored value cards. Non-payment transactions also include those using identification cards. For example, AAA can use the system to authenticate the identity of one of its customers or a telephone card company can use the system to authenticate the identity of the user of a specific card.

FIG. 1 illustrates one embodiment of a core system architecture 1500 for implementing the account authentication system for various types of account authentication applications. System architecture 1500 includes three domains: a trusted party domain 1502, an interoperability domain 104, and a third party or requesting party domain 1506. The trusted party and the third party domains define functional realms within which are components that are totally or at least partially controlled by the trusted or third party, respectively. The interoperability domain defines a functional realm within which are components may be utilized by the trusted party, the third party, as well as other parties, such as a service organization.

The trusted party domain 1502 includes components that are primarily controlled by a trusted party. An example of a trusted party is a financial institution that issues payment cards to consumers, known as an issuing bank. Specifically, an issuer, or a card issuer, personalizes new cards received from a card supplier and then issues these cards to its customers. Personalization may also be performed by the card supplier or by a personalization bureau. In addition to being a financial institution, an issuer may be any suitable issuing entity such as telecommunications network operator, a service association, a merchant or other organization, or even an agent acting for an issuer. Third party or requesting party domain 1506 includes components that are primarily controlled by a third party and/or a requesting party. A requesting party can be any party who makes a requests for the identity of an account holder to be authenticated. For example, a requesting party can be a merchant who desires to authenticated the identity of a person alleging to be the owner of a credit card account. A third party can be an acquirer who is a financial institution that enrolls merchants in the payment scheme and manages the accounts of merchants. An acquirer also routes information from an online merchant to the telecommunications network. In other embodiments, a merchant can directly route information to the telecommunications network.

Interoperability domain 104 can be supported by the Internet and includes components used by both the trusted party and the third party.

Trusted party domain 1502 includes an issuer cardholder system 110, an enrollment server 112, an access control server (ACS) 114, and an account holder file 118. Additional components are included within trusted party domain 1502 depending upon the specific field of use in which the system will be used. For example in the payment transactions below, additional components in each of the domains are present for the purpose of authenticating account holder identities with respect to payment transactions.

Enrollment server 112 is a computer that manages an account holder's enrollment into the account authentication system by presenting a series of questions via a web interface to be answered by the account holder and verified by the trusted party. As shown in FIG. 1, the trusted party operates enrollment server 112. However, a service organization such as Visa can operate enrollment server 112 on behalf of the trusted party. The trusted party can use a web-enabled, interactive "identity authentication service" provided by an outside entity during the enrollment process to help validate an account holder's identity.

ACS 114 is a computer that has a database of account holders registered for the account authentication service provided by the account authentication system. ACS 114 contains account and password information for each account holder. During an account authentication transaction, ACS 114 provides digitally signed receipts to an authentication requesting party, controls access to the account authentication system, and validates account holder participation in the service. A card issuer or a service organization such as Visa can operate ACS 114 for the trusted party. While the account authentication service does not require any additional cardholder software to be used, optional account holder software and hardware may be deployed. Additional account holder software can support additional authentication techniques such as digital certificates, integrated circuit cards (chip cards) and chip card readers. Note that in the present invention, the only system participant requiring a certificate is the issuing financial institution.

Account holder file 118 is a trusted party managed database for storing information relating to the account holders who are successfully enrolled with the account authentication system. Issuer cardholder system 110 (or Trusted Party Account Holder System) is controlled by the trusted party and contains information about account holders. Such information relates to account information, services utilized by the cardholder, etc. Some of the information within the issuer cardholder system 110 can be used in enrolling account holders into the account authentication service.

A third or requesting party 1532 of third party or requesting party domain 1506 typically desires the authentication of an account holder. Party 1532 manages requesting plug-in software 1534 that facilitates the authentication protocol. Requesting plug-in software module 1534 is a software module that integrates into a third or requesting party's web site. Plug-in software module 1534 provides the interface between the account authentication system and the third party's processing software, for example, the payment processing software of a merchant.

Interoperability domain 104 contains the directory server 128, is supported by the Internet, and includes components used by both the trusted party and the third party. Directory server 128 routes authentication requests from requesting parties to specific ACS's, such as ACS 114. Directory server 128 is operated by a card scheme manager or a service organization, such as Visa. Interoperability domain 104 can also be supported by a network other than the Internet.

Account Authentication System for Payment Transactions

A description of the system architecture for authenticating an account holder in the realm of payment transactions will now be provided. Note that many of the general concepts described in this section are applicable to various fields of use since the authentication process for payment applications is analogous to non-payment applications.

An exemplary use of the authentication system and protocol in payment transactions is described as follows. The authentication system is useful in a scenario when a cardholder shops online, adds items to a "shopping cart," proceeds to the online merchant's checkout page, and completes the online merchant's checkout forms. The authentication processes can take place after the consumer decides to buy his or her desired products or services, for example, after the consumer clicks a "buy" button. The authentication process can also begin at various other times in the consumer's payment transaction. The authentication process is conducted mostly in a transparent mode to the consumer by utilizing software that has been incorporated in several points of a payment network. The system validates participation by the cardholder and the cardholder's financial institution with the authentication service. Then a window is created in which the consumer can confirm his or her identity by requesting a previously registered password from the cardholder. If the identity of the consumer is confirmed, the payment information and notice of the consumer's authentication is sent back to the merchant. Then, as conventionally performed, the payment transaction is processed by the merchant. For example, the merchant may send an order confirmation message to the cardholder's browser.

Figure 2:
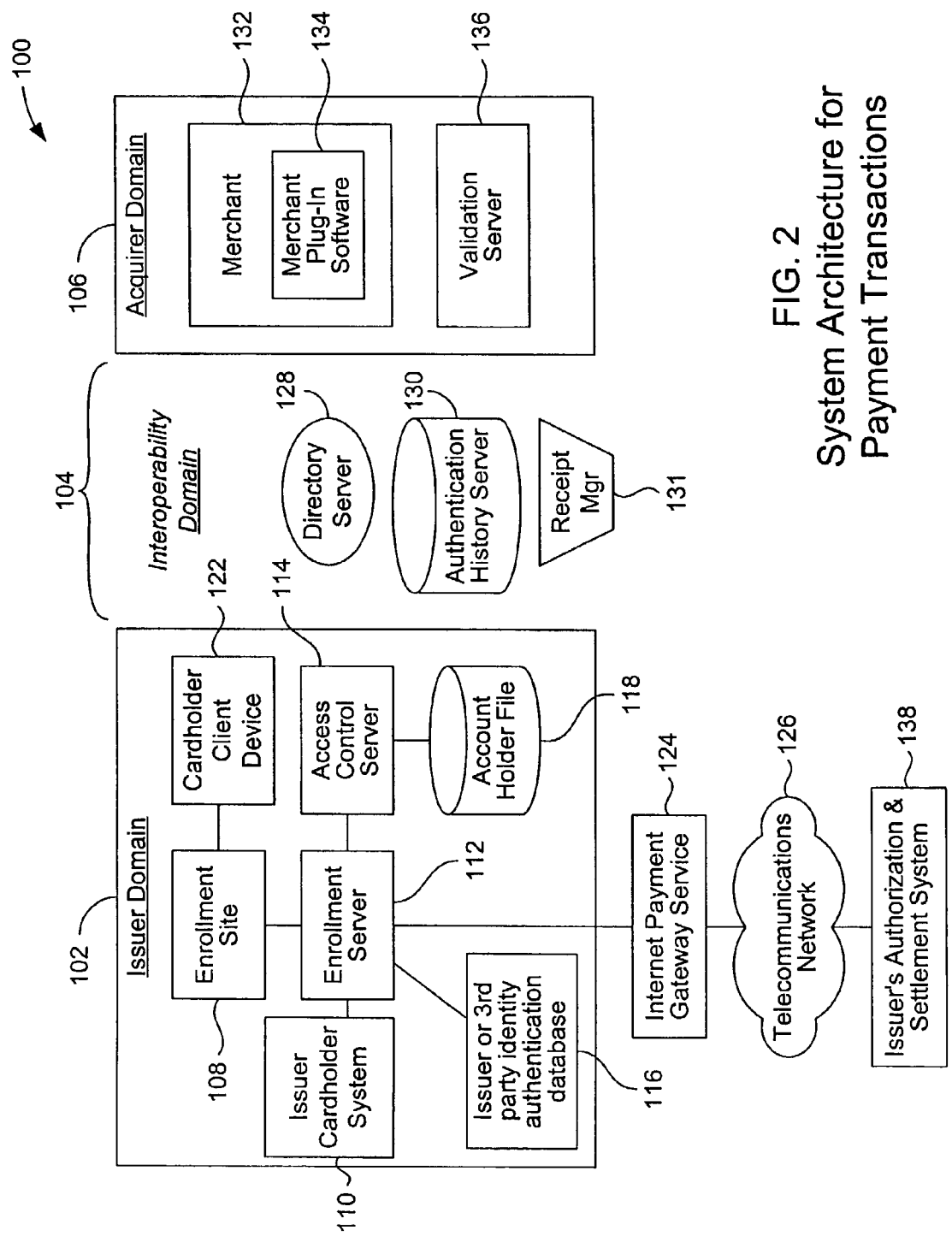
FIG. 2 schematically illustrates one embodiment of a system architecture 100 that supports the authentication service of the present invention in payment transactions.

FIG. 2 schematically illustrates one embodiment of a system architecture 100 that supports the authentication service in payment transactions. As with the general system architecture 1500 of FIG. 1, architecture 100 is divided into three domains: issuer domain 102, interoperability domain 104, and acquirer domain 106. Issuer domain 102 and acquirer domain 106 of FIG. 2 are analogous to trusted party domain 1502 and third party or requesting party domain 1506 of FIG. 1, respectively.

Issuer domain 102 includes an enrollment site 108, an issuer cardholder system 110, a cardholder client device 122, an enrollment server 112, an access control server (ACS) 114, an issuer or third party identity authentication component 116, and an account holder file 118. Optionally, the issuer domain 102 can include an issuer file of approved cardholders 120. Enrollment server 112 is a computer that manages cardholder enrollment into the account authentication system through presenting a series of questions via a web interface to be answered by the cardholder and verified by the issuer. Enrollment server 112 is connected via the Internet to the Internet Payment Gateway Service 124, which is in turn, connected to a telecommunications network 126, for example, VisaNet. The Internet Payment Gateway Service 124 allows enrollment server 112 to communicate with telecommunications network 126. The connection via Payment Gateway Service 124 allows enrollment server 112 to query the issuer's authorization system 127 to determine if a cardholder being enrolled has an active card account. Enrollment site 108 is an Internet web site where the cardholder can register to participate in the account authentication service provided by the account authentication system.

Cardholder client device 122 is used by the cardholder to participate in the account authentication system. Specifically, cardholder client device 122 can be any device capable of accessing the Internet, such as a personal computer, mobile telephone, a personal data assistant, or an interactive cable television. In some embodiments, cardholder client device 122 cannot connect to the Internet, however such devices can still be used by a cardholder because input and output messages from client device 122 are routed through special nodes that can handle non-Internet based messages. For example, mobile telephones that transmit and receive messages based upon voice and/or text messages do not connect to the Internet, however they can still be used with the account authentication system by routing messages in a different manner. The Short Message Service (SMS) is a commonly used example of a messaging system. An Interactive Voice Response (IVR) unit can be used for automated exchanges over a voice channel. This message routing arrangement will be described in more detail in the following section on non-Internet capable devices.

Issuer cardholder system 110 is an issuer-controlled system containing information about cardholders. This system information contains information concerning account information, services utilized by the cardholder, etc. Some of the information within the issuer cardholder system can be used in the process for enrolling cardholders into the account authentication system.

Issuer or third party identity authentication database 116 contains information that the issuer or third party already has on file regarding cardholders. Database 116 is used by issuer in the process of enrolling cardholders to verify the identity of the cardholders. For instance, information entered by cardholders during the accountholder registration process must match the information already on file in authentication database 116 in order for cardholders to successfully register for the service provided by the account authentication system. Third parties can be companies such as Equifax.

Interoperability domain 104 includes a directory server 128, an authentication history server 130 and a receipt manager 131. Directory server 128 routes authentication requests from merchants to specific ACS's. Directory server 128 is operated by a service organization, such as Visa. Authentication history server 130 and receipt manager 131 store signed receipts (e.g., copies of the Payment Request Response message that are described below) for each authenticated payment transaction. Authentication history server 130 contains information that verifies which transactions were authenticated and provides additional information during dispute resolution processes. Authentication history server 130 and receipt manager 131 are operated by a service organization. The issuer, acquirer, or merchant can also maintain a copy of the digitally signed receipt.

Acquirer domain 106 includes the merchant 132 and the validation server 136. A merchant plug-in software module 134 resides at the location of merchant 132. Merchant plug-in software module 134 is a software module that integrates into a merchant's electronic commerce web sites. Plug-in software module 134 provides the interface between the account authentication system and the merchant's payment processing software. Validation server 136 verifies the digital signature of the card issuer used to sign the receipt returned by the account authentication system to the merchant during the payment transaction. In alternative embodiments, the functionality of validation server 136 may be included within merchant plug-in software module 134, thus eliminating the need for a separate validation server 136. Validation server 136 is operated by the merchant, the acquirer, or by a service organization.

In some embodiments, the account authentication system can interoperate with other cardholder applications, such as electronic wallets, and the service can operate compatibly with electronic commerce mark-up language (ECML software). The account authentication system also provides capabilities to implement dispute resolution procedures. For instance, a merchant can retain sufficient information to provide proof of cardholder authentication for the purposes of dispute resolution and charge-backs.

Set-Up and Registration Description

The description will now provide further detail for setting up the account authentication system for both payment and non-payment transactions. First, the procedures required to set up the various system participants such that they can use the account authentication system will be explained. Then the account holder's process for registering with the account authentication system will be explained. After these phases are described, explanation will be provided as to the actual authorization of payment transactions.

Setting up the account authentication system involves set up procedures for all the participants within the system. The set-up procedures are generally the same for both the authorization of payment and non-payment transactions. These participants include entities such as merchants or other authentication requesting parties, financial institutions or other trusted parties, and account or card holders.

Requesting parties, such as online merchants, who sign up with the account authentication system receive plug-in software modules such as plug-in software module 1534 in FIG. 1 and module 134 in FIG. 2. The plug-in software module should be specific to the computing platform and server software used by the requesting party. Requesting parties, such as financial institutions, participating within the account authentication system will provide their service logos and marketing designs to be incorporated into their customized enrollment site template. Third parties that are acquiring banks should also provide merchants with a service organization certification authority (CA) root certificate, a service organization certification authority SSL certificate for client authentication, and integration support.

Before a trusted party can be set up to use the account authentication system, they must obtain and install a copy of all account authentication system hardware and software specified in the trusted party domain. Trusted parties such as issuer financial institutions will also provide identity authentication policies and participating BIN information to the account authentication system to be used in the cardholder identity verification processes. Optionally, the Issuer can provide the cardholder authentication information to the account authentication system for pre-loading into account holder file 118. Pre-loading facilitates large volume support of cardholders. For example, when a trusted party desires to activate all or most of its cardholders for account authentication services, the trusted party can send personal identification numbers (PIN numbers) to all of its cardholders. The PIN number can then be used by each cardholder to access his or her preloaded passwords. In this manner, the enrollment process is expedited because each cardholder need not go through the formal enrollment process. After the cardholders use their preloaded password for the first time, the cardholders have the option of designating a new and easier to remember password.

Cardholder authentication information includes information such as business identification, country code, card account number, card expiration date, cardholder name, issuer-specific authentication data specified in the "participating BIN" data (e.g., mother's maiden name), and other information such as billing address, shipping address, social security number, telephone number, account balance, transaction history, and driver license number. Trusted parties should also provide account number ranges for their card account portfolios and ACS IP addresses (URLs) to the directory server. With respect to payment applications of the account authentication system, the service can be offered through bank branded web-sites, which allow for cardholder registration.

Figure 3:
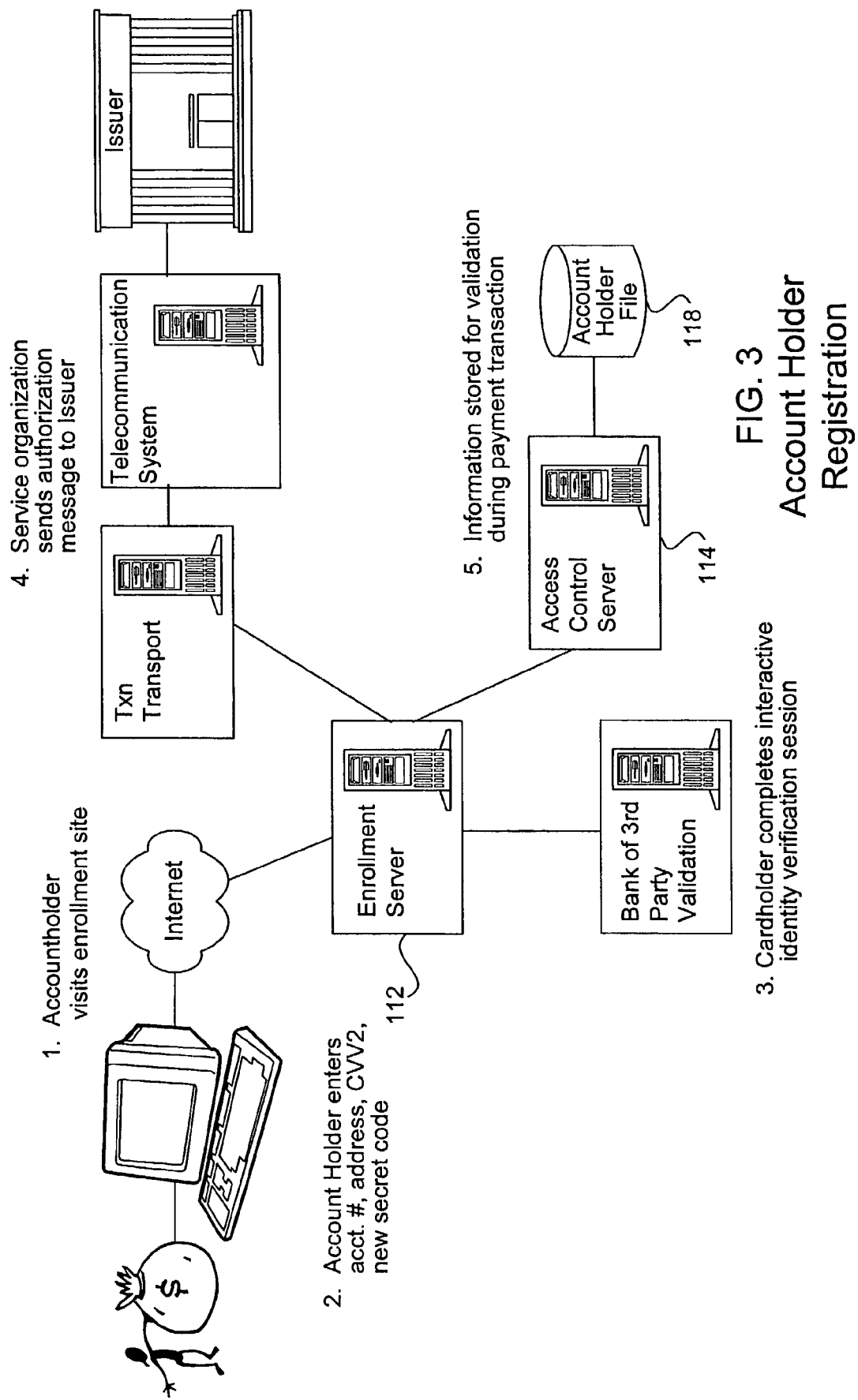
FIG. 3 illustrates the process through which an account holder registers with the account authentication system according to one embodiment of the present invention.

FIG. 3 illustrates the process through which an account holder registers with the account authentication system according to one embodiment. As shown in step 1, account holders visit an enrollment server Internet web site maintained by a trusted party, for example, an issuer financial institution. Account holders register with the account authentication system by registering their account numbers. For example, with payment transactions, an account holder can register his or her credit, check, or debit card account number. With respect to non-payment transactions, an account holder can register an account number held with an insurance or brokerage company. Account holders can register one or more cards.

At step 2 the account holder enters information such as a primary account number (PAN), name and card expiration date. At this point, the account holder can also enter additional information. For instance, address, e-mail address, shopper identification, an account verification value, cardholder-specific password, and issuer-specific authentication information can also be entered. This information can be entered in a page at the enrollment web site such as page 300 shown in FIG. 4.

After the account holder enters the requested information at enrollment site 108, the account authentication system verifies that the account holder's PAN falls within a card range that is registered by the trusted party in directory server 128 of interoperability domain 104. Account holder identities can be verified using various methods. First, as just mentioned, account holder identities can be verified through a third party authentication database or through the trusted party's own authentication database. Additionally, verification can be performed by using a file of approved cardholders 120 provided by the trusted party, by transmitting status check authorizations to the trusted party, and by comparing responses to pre-loaded information provided by financial institutions.

If the PAN is not within an enrolled card range, the enrollment is rejected and the enrollment process is terminated. In a payment transaction, if the PAN is within an enrolled card range, an authorization for one dollar (or any other nominal amount) will be submitted through a service organization payment network, such as VisaNet, to the issuer financial institution. The authorization of the one-dollar transaction allows the issuer to verify the card account status, the address using the Address Verification Service, and the Cardholder Verification Value 2 (CVV2). The CVV2 is a three-digit number printed on the signature strip on the back of the payment cards. In a non-payment transaction, a one-dollar transaction is not required if the PAN is with the enrolled card number range.

At step 3 the account holder is prompted for additional authentication information to verify the account holder's identity in an interactive, real-time, online session. In some embodiments, the account holder can also be requested to enter a password and a "hint question and response" pair that will be used to authenticate the account holder during the authentication transaction.

As shown in step 4, when the account holder's identity is verified and the appropriate responses are returned, an authorization message is sent to the issuer financial institution. Then at step 5, enrollment server 112 passes account holder information to ACS 114 to set up records in account holder file 118. Account holder file 118 can store information such as: financial institution BIN numbers, account numbers, expiration dates, first and last names, driver's license numbers, billing addresses, social security numbers, cardholder passwords, cardholder password questions, cardholder password answers, cardholder email addresses, third party identity scores, and other information.

In some embodiments, during the registration process, the account holder can be asked to enter a phrase, called the personal assurance message (PAM), that is recognizable to the account holder. PAM is later presented to the account holder by the trusted party during an authentication process. Since only the trusted party knows the account holder's designated PAM, the account holder can be assured that a dialog window used with the account authentication system was delivered from the trusted party. An example PAM is, "the sky is blue."

It should be noted that account holders require no new client software or devices to use the authentication system. In a preferred embodiment, the account holder registration process utilizes security protocols such as SSL channel encryption to protect data transmitted across the Internet between the account holder and the enrollment server.

Also, during the registration or enrollment process, each trusted party could display its own "terms of use" and/or "data privacy policy." Each trusted party has the ability to require registering account holders to either accept or decline the terms and policies in order to complete the registration process. The version numbers of the "terms of use" and/or the "data privacy policy" accepted by each account holder should be saved by the trusted parties.

Payment Transaction Description

Figure 12:
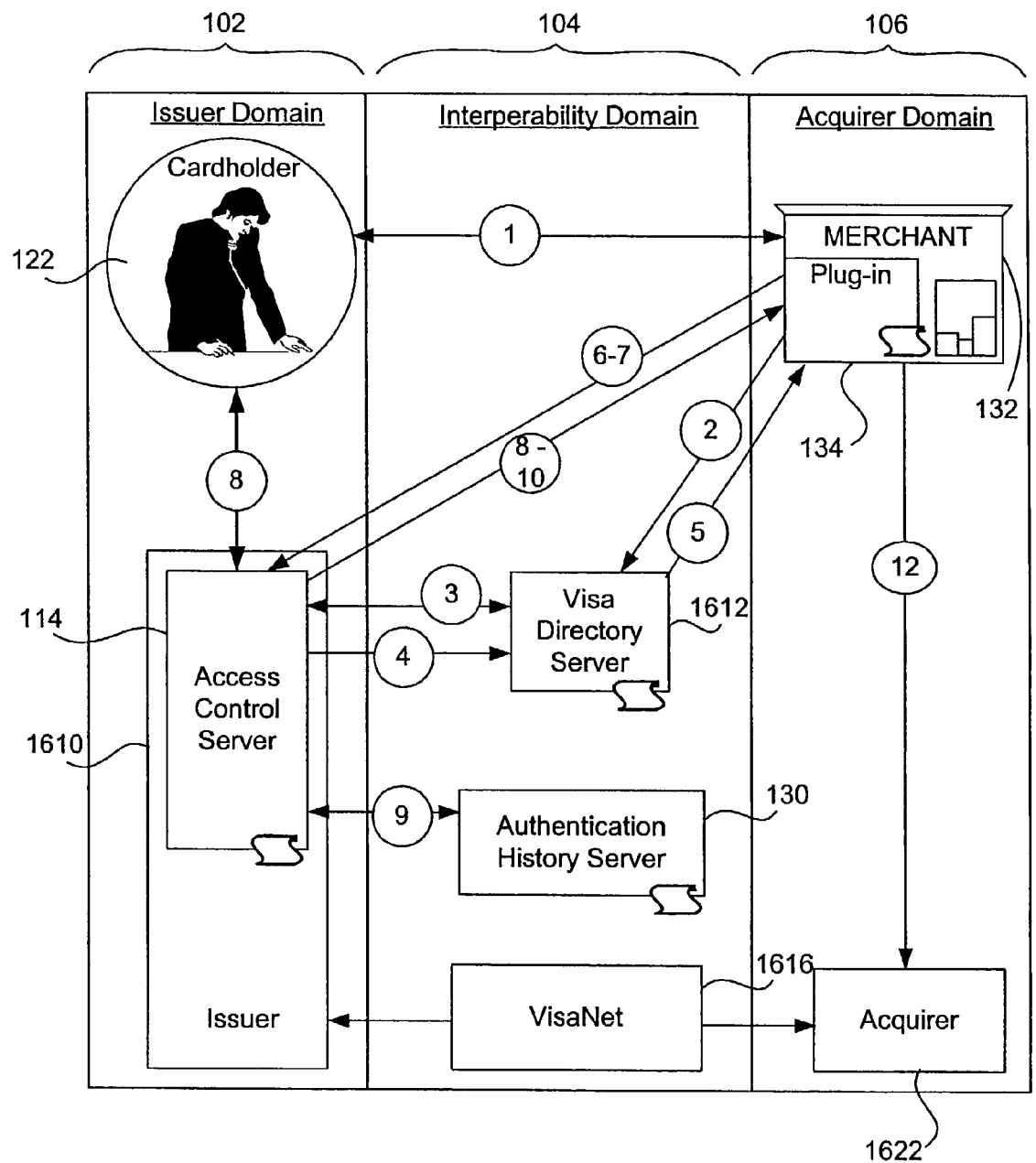
FIG. 12 describes an exemplary payment transaction in which voice and messaging devices are utilized.

After all participants are set up and the account holders are registered, account authentication is performed. Account authentication can be performed in a variety of manners depending upon the particular systems utilized by the participants. Three implementations that will be described concern: a conventional computer that is connected to the Internet (FIGS. 5-8), a mobile device that connects to the Internet (FIG. 9), and a mobile device that cannot connect to the Internet (FIGS. 10-12). As will be described below, the main difference among each of the three variations is how a payment request and payment response message is created and transmitted between the plug-in software module (in the Requesting Party domain) and the access control server (in the Trusted Party domain). Note that FIGS. 5-12 illustrate the process for authenticating account holder identifications in payment transactions.

Figure 5:
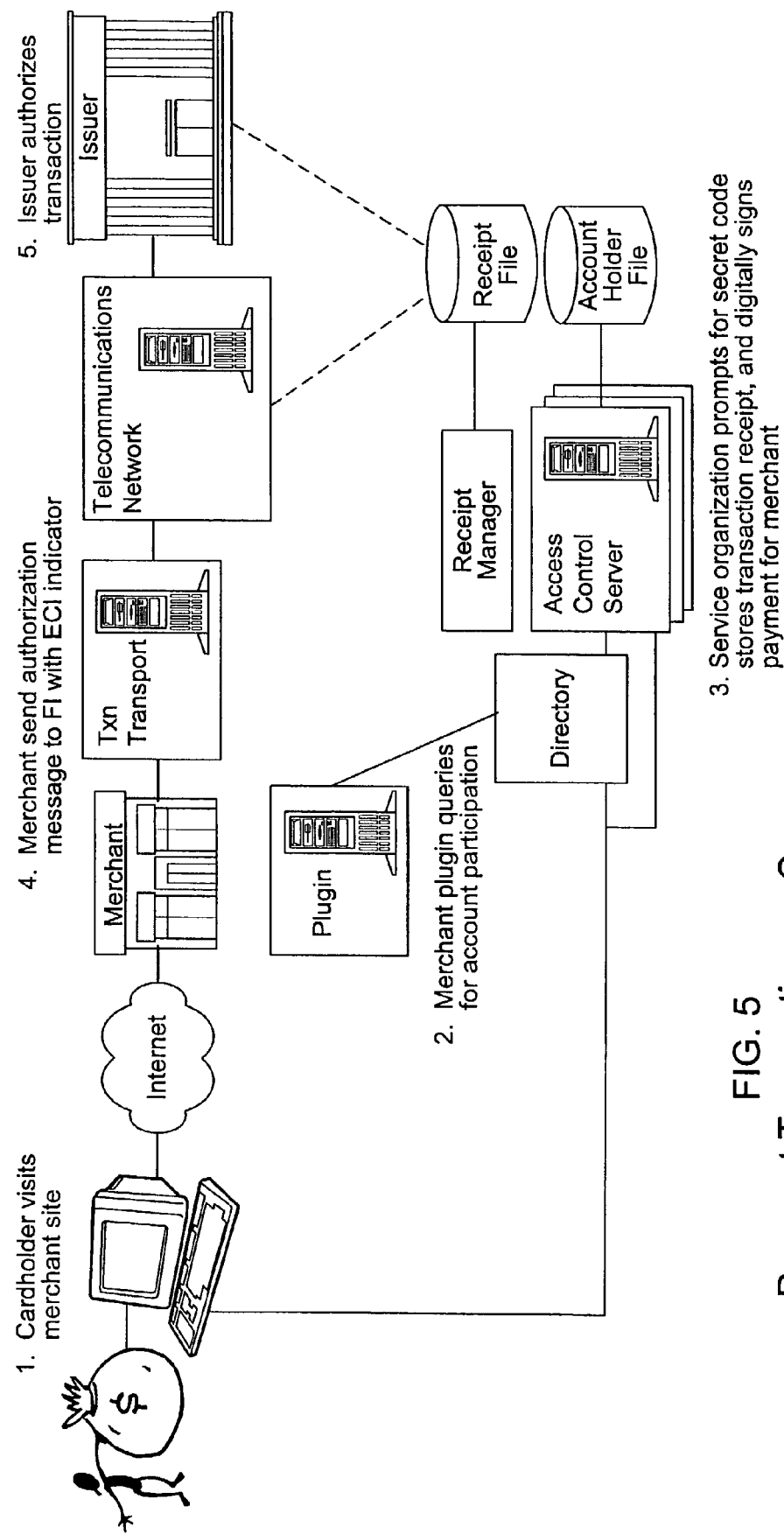
FIG. 5 describes an authenticated payment transaction on the core account authentication system where an account holder uses a computer that is connected to the Internet.
Figure 6:
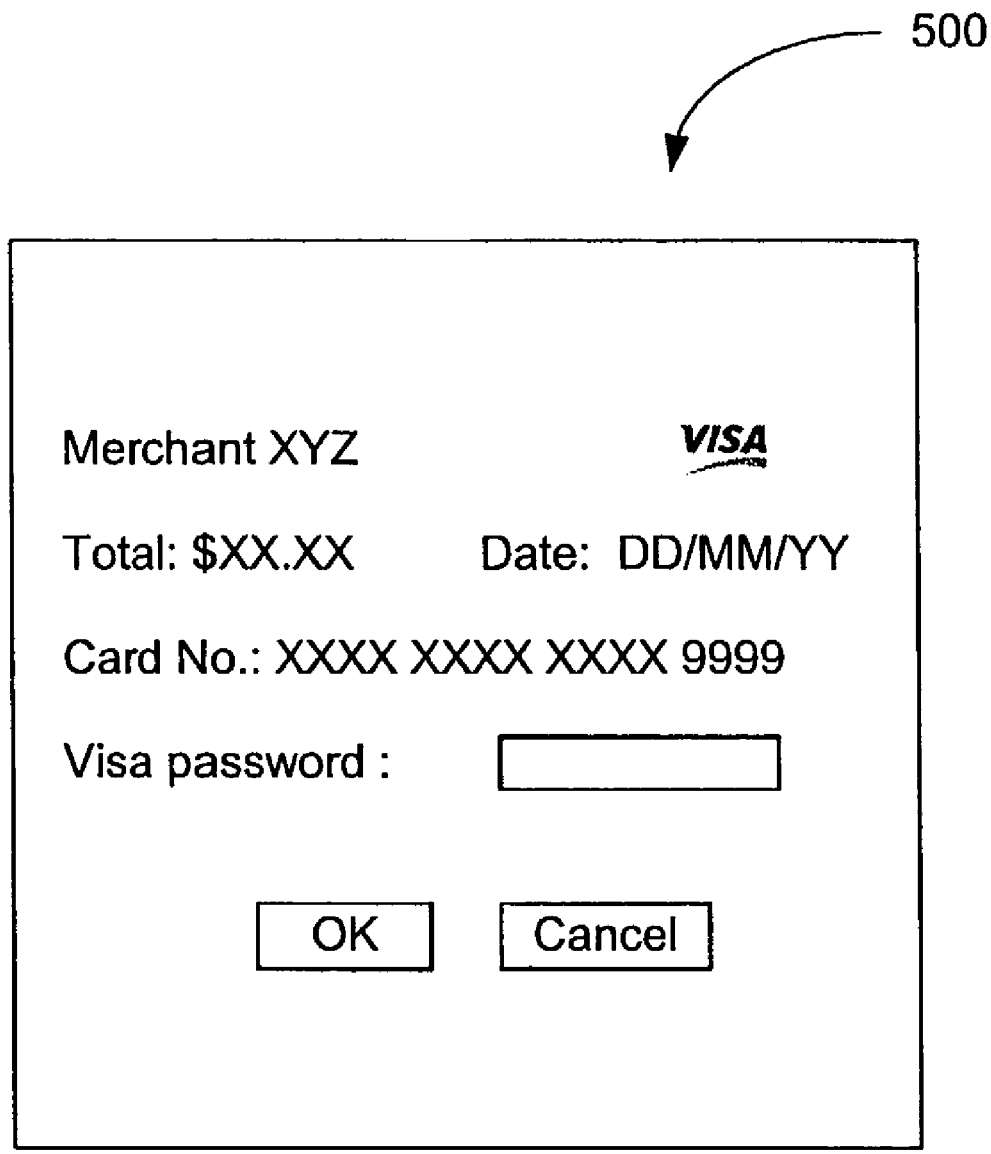
FIG. 6 illustrates an exemplary window that prompts the cardholder for his or her password.
Figure 7:
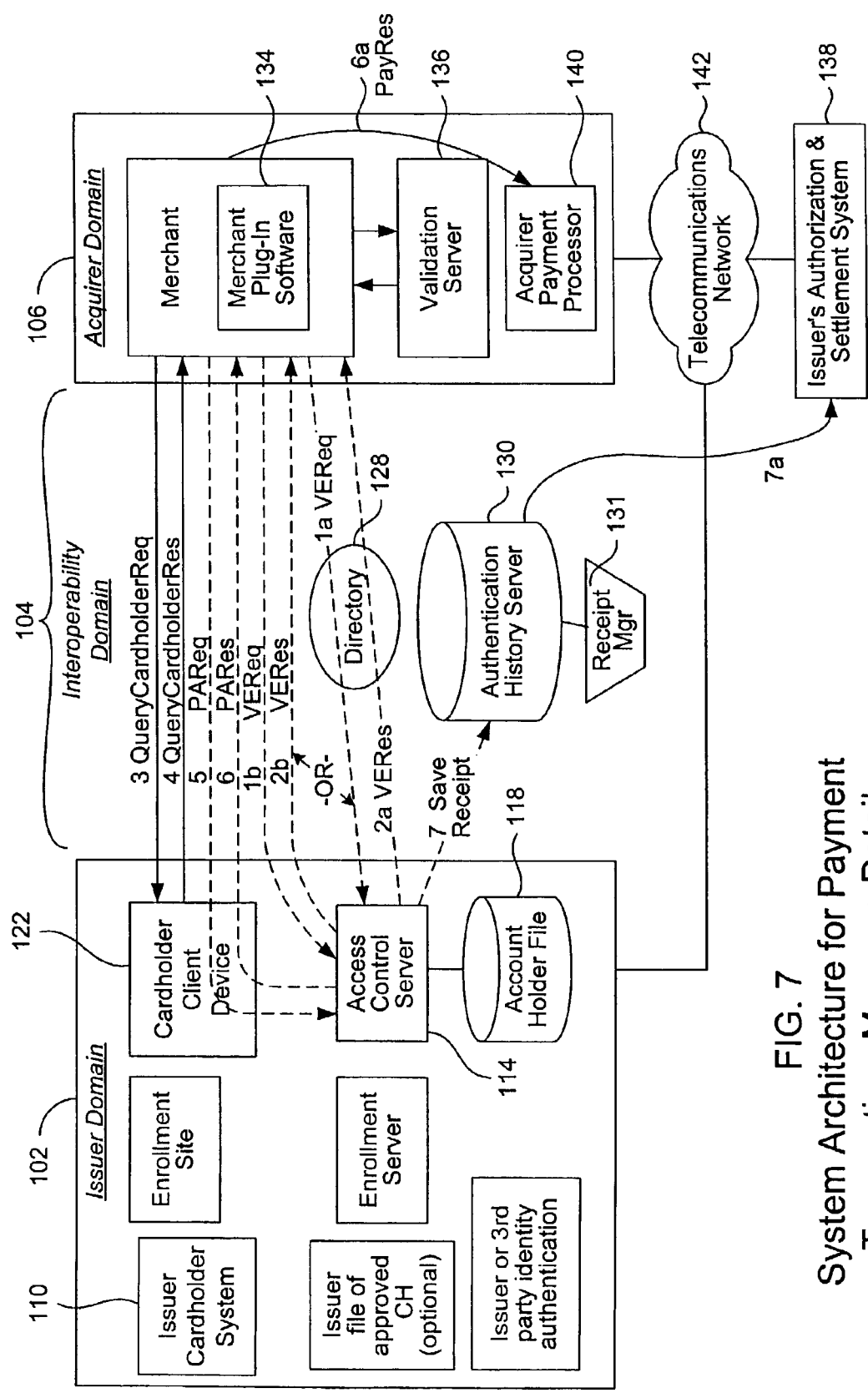
FIG. 7 illustrates exemplary messages that are sent during the payment transaction superimposed over the core account authentication system where a consumer uses a computer that is connected to the Internet.
Figure 8:
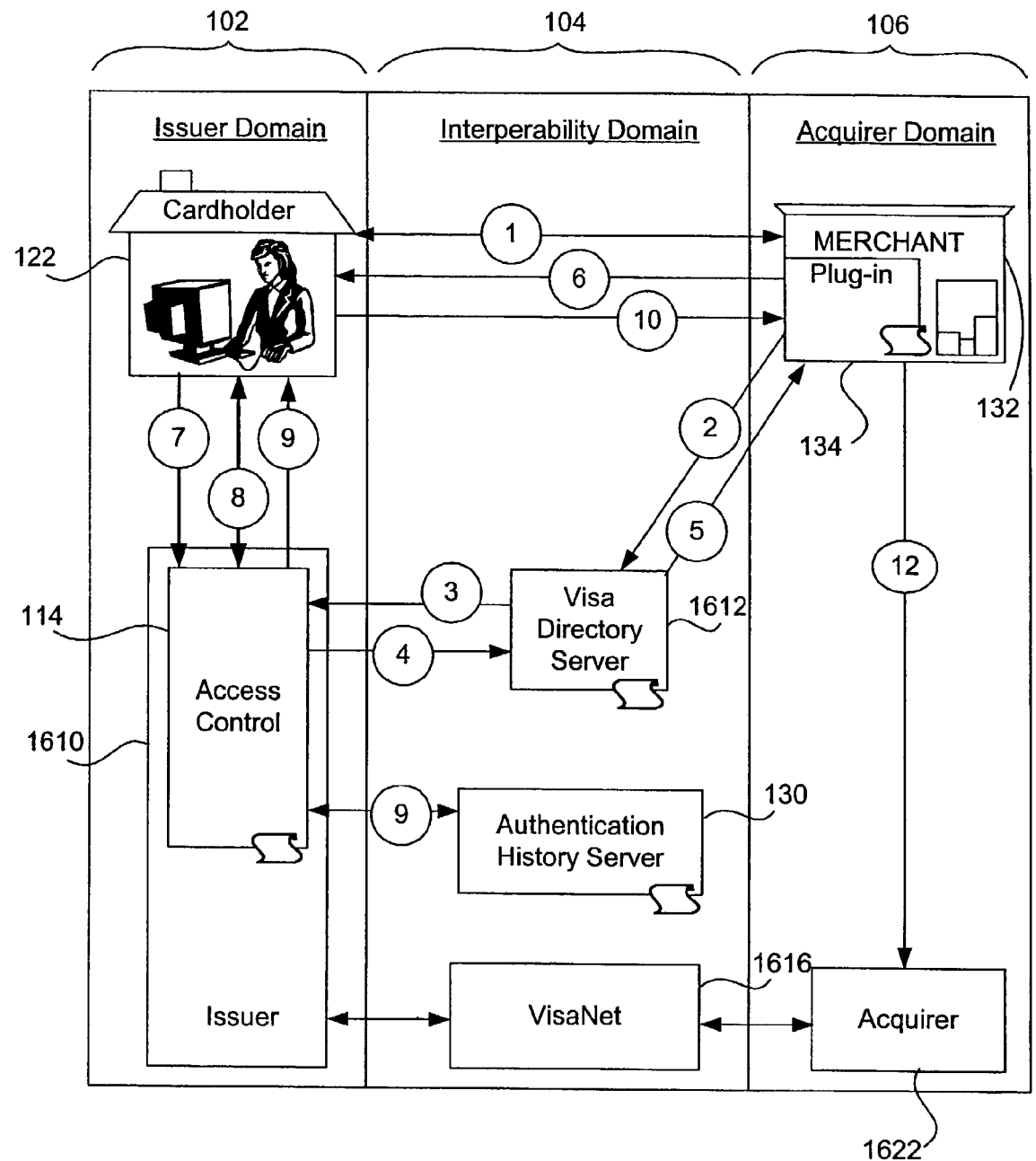
FIG. 8 illustrates an alternative view of a payment transaction on the core account authentication system superimposed over an account authentication system architecture according to one embodiment.

With respect to the scenario where the account holder uses a conventional computer that is linked to the Internet, FIG. 5 illustrates a high level overview of the payment transaction, FIG. 7 illustrates a lower-level view of the specific messages transmitted during the transaction, and FIG. 8 illustrates a mid-level view of the payment transaction. The description for these payment transactions also sufficiently describes the authentication process for non-payment transactions. Specific description as to non-payment transactions is provided throughout the description where appropriate.

FIG. 5 describes an authenticated payment transaction using the core account authentication system where an account holder uses a computer that is connected to the Internet. In step 1 of FIG. 5, an account holder visits a merchant's electronic commerce site on the Internet. The account holder can also be referred to as a cardholder since in a payment transaction the most common type of account held by an account holder will be some sort of credit, debit, or check card account. After the cardholder selects the products or services he or she wishes to purchase, the cardholder begins the checkout process, completes the checkout form, and then clicks on a "buy" button.

After the "buy" button is selected as shown in step 2 of FIG. 5, the merchant plug-in software module is activated and then performs a verification process to determine whether the cardholder's specific account is registered with the account authentication system. There are various methods by which the merchant plug-in software module can determine if the cardholder is registered with the account authentication system. For instance, a two-step process in which the directory server and then the ACS associated with the cardholder is checked, a process where only the ACS is checked, and a method in which the merchant can check a cache memory containing the same information held in the directory server can be used.

A description of the two-step process will now be provided. Reference to FIG. 2 will be made during this description. In the first step, the merchant plug-in software module identifies the card account number and queries the directory server 128 to verify that the account number is within a range of numbers associated with an issuer bank that is a participant of the account authentication system. If the account number does not fall within a range of account numbers defined on the directory server 128, then the issuer and thereby its cardholder are not registered. In this case the merchant is notified that the account number is not registered and the merchant plug-in software module 134 returns control of the transaction back to the merchant storefront software. At this point, the merchant storefront software can proceed with the transaction, as it normally would, refuse further service to the cardholder, or proceed with alternative payment methods.

On the other hand, if the account number is determined to be within a range of account numbers present in directory server 128, then the second step of the verification process begins. The second step of the verification begins when directory 128 sends the account number to an ACS to determine if the account number is enrolled. If the card is not enrolled, the enrollment process is terminated. If the ACS indicates that the card is enrolled, the ACS via the directory server returns its URL Internet address to the merchant plug-in. The merchant plug-in then invokes the ACS via the cardholder client device and its resident browser. Once again it is noted that there can be multiple ACS's in PAS.

A second method of checking to see if the cardholder is registered with the account authentication system is for merchant plug-in software module 134 to directly query ACS 114 without first querying directory server 128. The third method, as mentioned above, is for the merchant to have a cache memory containing the same information held at the directory server 128. In this manner the merchant can at least do a preliminary check.

It should be noted that there could be more than one physical directory server in the account authentication system. However, it is preferable that there be only one logical directory server. In other words, all of the directory servers should be consistent in that they contain the same information.

If the cardholder is a participant in the account authentication system, ACS 114 displays a bank branded window to the cardholder. The bank branded window contains basic payment transaction information and prompts the cardholder for his authentication password or token. See FIG. 6 for an exemplary window 500 that prompts the cardholder for his or her authentication password. The cardholder enters his or her authentication password and ACS 114 verifies the authentication password. The size and layout of window 500 varies depending upon the parameters of the device used by the cardholder. As is common today, the cardholder can be given a certain number of attempts to correctly enter the authentication password. If the cardholder is unable to correctly enter the authentication password, then the cardholder can be prompted with the hint question that was established during the cardholder's registration process. Preferably, the cardholder is given one chance to enter the correct answer in response to the hint question.

The payment authentication continues if the correct authentication password or token is immediately entered or the cardholder provides the correct response to the hint question. The ACS then proceeds to digitally sign a receipt using the issuer's signature key or a service provider's key. This receipt will contain the merchant name, card account number, payment amount, and the payment date. In some embodiments, the receipt is a copy of the Payment Authentication Response (PARes) message, or a message having at least some of the information fields copied from the PARes message. The authentication history server 130 stores the following transaction data: merchant name, merchant URL, card account number, expiration date, payment amount, payment date, the issuer payment signature and the cardholder authentication verification value. The ACS then redirects the cardholder back to the merchant plug-in through the cardholder browser. At this point, the ACS also passes to the merchant the digitally signed receipt and the determination as to whether the cardholder has been authenticated. The validation server 136, in the acquirer domain 106, is used by the merchant plug-in 134, to verify the digital signature used to sign the payment receipt. After verifying the digital signature, the cardholder is deemed "authenticated." In some embodiments, after the transaction is completed, the cardholder will also have the ability to re-register his or her card account and create a new password to be used for future online purchases.

After the cardholder is authenticated in step 3, step 4 initiates the process for authorizing the specific cardholder's account. Authorization refers to the process of verifying that a cardholder has adequate credit and is in good standing for a specific purchase. In contrast, authentication refers to the process of verifying the identity of an account holder. In step 4 the merchant uses the merchant plug-in software module to send an authorization message to a payment network such as VisaNet. The payment network in turn, forwards the authorization message and an electronic commerce indicator (ECI) to an issuer financial institution. The authorization message is a message as is commonly known in the art. The authorization message is sent to the issuer so that the issuer financial institution can verify to the merchant that a specific account is in good standing and has adequate credit line for the requested purchase amount of the payment transaction. The ECI indicates that the transaction was completed over the Internet and indicates that level of message security (i.e., channel encryption (SSL), in the clear) and authentication used.

In alternative embodiments, the merchant is capable of providing additional information along with the authorization message. For instance, the following information can also be sent: a flag indicating if the cardholder was successfully authenticated, account information, digital signatures, a cardholder verification value 2, card authentication verification value (CAVV), an offline PIN authenticated by chip card Europay, Mastercard, and Visa (EMV) cryptogram, and the necessary fields to provide the merchant with guaranteed payment. The CAVV is data is created by the ACS which authenticated the cardholder and is a unique value for a given payment card and a specific payment transaction from that card. It is used by issuers to uniquely identify authenticated payment transactions if any subsequent disputes occur. After the issuer financial institution processing of the authorization transaction is complete, control of the payment transaction is then returned to the merchant's storefront software via the payment network. The issuer then returns the authorization response via the payment network to the merchant. In step 5 of FIG. 5, the issuer financial institution will either authorize or decline the transaction. In some embodiments, the authorization messages can be batched and sent in a group at a later time. The authentication information is also included in the batch authorization messages.

Access control server (ACS) 114 is capable of various other functions. For example, the ACS can deactivate registered accounts from the database. Accounts can be deactivated manually, by the cardholder, or by the issuer. ACS 114 can also provide a simplified renewal registration process when the cardholder receives a replacement card. ACS 114 can support multiple users of the same registered account with unique access control information. When providing a user with a connection to ACS 114 for payment transactions or account updating, ACS 114 can validate the user as an authorized cardholder of the registered account through one or more of the following mechanisms: pass phrase, digital signatures, an online PIN number, or and off-line PIN authentication by chip card EMV cryptogram.

Merchant 132 can interoperate with existing systems where the merchant has the cardholder account information on file, interoperate with existing merchant authorization and clearing systems, support third parties who provide services to multiple merchants, support a variety of payment interfaces between the merchant and the acquirer, and minimize the mandatory impact to payment network authorization messages from the acquirer when setting the value of the electronic commerce indicator (ECI).

One method for routing transactions from the merchant to an ACS is to have a directory that provides the address of the server based on the cardholder account number. In such a method, requests for routing information are only acceptable from authenticated merchants. When activity from a merchant exceeds normal activity, then account authentication system can deny access to a merchant whose acquirer indicates that such access is no longer valid. This could be the case when merchant fraud is deemed probable. Merchant authentication to the account authentication system can be deployed, but deployment is not required. Merchant authentication can help minimize merchant fraud.

FIG. 7 illustrates specific messages that are transmitted during a payment transaction using the core account authentication system where a consumer uses a computer that is connected to the Internet according to one embodiment. The messages of FIG. 7 are superimposed over the payment system architecture as shown in FIG. 2. It should be understood that even though the messages and the data fields within each of the messages are given specific names, these names do not affect the performance of the authentication protocol. Therefore, different names can be assigned to the messages and data fields discussed below.

As described above, the payment transaction begins when a cardholder visits a merchant website via a browser and selects items to purchase. The merchant's payment system will ask the cardholder to enter his or her payment information. Generally, entry of the payment information should occur in a secure environment, for example, through the use of SSL encryption protocol. When the cardholder indicates that he or she is ready to finalize the transaction, the merchant's payment system invokes merchant plug-in software module 134. Then as shown by line 1*a*, plug-in software module 134 checks directory server 128 for the specific URL of the ACS that may contain the cardholder's Payer Authentication Number (PAN) to validate that the cardholder is enrolled in the service. Alternatively, plug-in software module 134 checks its own cache memory that contains this information. Plug-in module 134 can also check ACS 114 to verify that cardholder's PAN is enrolled with the account authentication system. In the case that plug-in module 134 can check its own cache, plug-in module 134 should have the ability to copy the contents of directory 128 into its local cache. If this capability is used, the merchant can determine immediately from its cache if the account is part of an enrolled range. If the merchant implements this capability, the contents of the cache should expire and be refreshed at least every 24 hours. The cache should be requested when the merchant plug-in software module 134 is loaded and at regular time intervals thereafter.

Plug-in software module 134 searches for the PAN by formatting a Verify Enrollment Request (VEReq) message using the cardholder PAN. If not already established, merchant plug-in software 134 will establish a secure connection with and authenticate itself to directory server 128 or ACS 114. Merchant plug-in software 114 will search for a card range entry that corresponds to the cardholder PAN at various locations.

After merchant plug-in software 114 conducts the search, the VEReq message is transmitted to ACS 114 either directly, as shown by line 1*b*, or after first passing through directory server 128, as shown by line 1*a*. When the VEReq message is transmitted to ACS 114 via directory server 128, directory server 128 searches for a record corresponding to the cardholder PAN contained in the VEReq message. On unsuccessful match, directory server 128 will format a Verify Enrollment Response (VERes) message with no URL value(s) and set the value of Status of PAN Enrollment or VERes-Status to "N." The VERes message is then returned to the merchant plug-in software. On the other hand, upon successful match, directory server 128 will, if not already established, establish a secure connection with and authenticate itself to the ACS URL. Then, the VEReq message is forwarded to the ACS URL. If that URL is not available, the merchant plug-in should proceed to the next ACS URL value (if available), and allow for up to a maximum of up to five ACS URL's to be searched. Of course, the number of URL's attempted is variable. If unsuccessful on all attempts, a VERes message is returned to the merchant plug-in with VERes-Status set to "N" to indicate to the merchant that the payment transaction cannot be processed using the account authentication system.

After the VEReq message is received by ACS 114, the ACS accepts the cardholder PAN from the VEReq message and validates it against account holder file 118. ACS 114 then formats a VERes message. In the case where a successful match occurs, the ACS sets the Status of PAN Enrollment to "Y," creates a single use proxy PAN, which ACS 114 will internally associate with the PAN, and populates the URL field(s) in the VEReq message. In the case of an unsuccessful match, the ACS sets the Status of PAN Enrollment to "N." Then, as shown by line 2*a*, the ACS returns a VERes message back to the merchant plug-in through directory server 128. For the case when a VEReq message is transmitted directly to the ACS, the VERes message is transmitted directly back to the merchant plug-in as shown in line 2*b*.

Caching the data of directory server 128 within MPI 134 can be facilitated by utilizing a CRReq and CRRes message pair. The CRReq message is sent from the merchant plug-in module to the directory server and requests the list of participating card ranges, in order for the plug-in module to update its cache. The CRRes message is the response containing the participating ranges.

In some embodiments, the account authentication system checks to see if the cardholder client device has distributed authentication capabilities by using a QueryCardholderReq and QueryCardholderRes message pair. The merchant plug-in will format and send a query, the QueryCardholderReq message, to cardholder client device 122 to determine if a distributed account authentication cardholder module is resident. Sending of the QueryCardholderReq message is shown in FIG. 7 by line 3. If any distributed authentication options are returned in the QueryCardholderRes message, the merchant plug-in will communicate directly with the cardholder client software to perform the authenticated steps. Sending of the QueryCardholderRes message is shown in FIG. 7 by line 4. Additionally, by using the QueryCardholderReq and QueryCardholderRes messages, the VEReq and VERes messages described below may be eliminated. Cardholder client software could be deployed with issuer's ACS URL embedded in the software. The merchant plug-in will complete the QueryCardholderReq and QueryCardholderRes messages first. If cardholder client software is detected, the PAReq message could be sent to the ACS or the cardholder client software without having to conduct the VEReq and VERes messages.

If the VERes-Status has a value not equal to "Y," then the merchant is notified that the payment transaction cannot be processed using the account authentication system. However, if the VERes-Status has a value of "Y," then MPI 134 will format a payer authentication request message (PAReq). MPI 134 will send the PAReq message via the cardholder client device browser to the issuer's ACS server, as is shown by line 5.

After the merchant plug-in passes the PAReq message to the issuer's ACS, the ASC displays a window to the cardholder. The window displays the payment details contained in the Payer Authentication Response (PARes) message in addition to other items such as: a Issuer's logo, a service organization mark or brand logo, merchant name, merchant location (URL), total purchase amount and currency, purchase date, card number, installment/recurring payment terms, order description or link to description, special terms and conditions of sale or link to this information, personal assurance message (PAM), and prompt for the cardholder's password or any other type of authenticating token.

The ACS will then prompt the cardholder to enter the appropriate password. The ACS accepts the cardholder input and validates it against account holder file 118. The account authentication system will allow, for example, a number of unsuccessful attempts (e.g., three attempts) to enter the correct password. Of course, the number of attempts allowed can be varied. After the final unsuccessful attempt, the account authentication system may display a hint question. The cardholder will need to enter the correct hint question response. The hint question associated with the cardholder is then displayed. The cardholder is provided at least one attempt to enter the correct response. If the cardholder provides an incorrect response, the merchant can be notified that a transaction using the account authentication system cannot be completed. If the cardholder provides the correct response, the transaction should be treated as if the password was matched. Note that if there is more than one entry for an account number, the various cardholder names are displayed in a drop down window. The cardholder can then select his or her name.

Upon matching of the password, the ACS generates and digitally signs a PARes message. The ACS also generates and sends a SaveReceipt message to the authentication history server 130 and receipt manager 131, as is shown by line 7. As shown by line 7a, the SaveReceipt message may also be passed from authentication history server 130 to the issuers authorization and settlement system 138 to allow the issuer to match up the payment authorization request with the payer authenticated transaction in real time. Sending the SaveReceipt message to the issuer's authorization and settlement system 138 allows the issuer to determine simultaneously if the authorization request is for an authenticated purchase. The ACS will then re-direct the signed PARes message back to the merchant server plug-in, as is shown by line 6.

After the signed PARes message is transmitted back to MPI 134, MPI 134 is reactivated. If the authentication status is a "Y," MPI 134 sends the PARes message to the validation server 136. In the case that the validation server functions are provided by MPI 134, MPI 134 validates the PARes message signature and returns the result of the signature validation. If the signature cannot be validated, MPI 134 will notify the merchant that the transaction cannot be processed using the account authentication system. If the authentication status is a "N," the merchant should send a prompt to the cardholder asking for additional information, request the cardholder to use a different payment card or form of payment, or process the payment transaction as a non-authenticated payment transaction.

In the case that acquirer domain 106 contains a validation server, the validation server 136 validates the signature on the PARes message. Validation server 136 then returns the result of the signature validation to MPI 134. If the signature cannot be validated, merchant plug-in notifies the merchant that the transaction cannot be processed using the account authentication system. On the other hand, if the signature is validated, the merchant proceeds with an authenticated payment authorization. The PARes message may also be passed from the merchant to its acquirer payment processor 140 as shown in line 6a. The PARes message may then be passed from the acquirer through a telecommunications network 142 to the issuer. Thus, the payer authentication results are made available to the issuer as part of the standard payment authorization process.

Now the security issues related to the various channels of transmission will be discussed. As a base line, all the channels of transmission are preferably encrypted using 128-bit SSL. The channel between the cardholder and the merchant includes two channels. The merchant should secure the connection that is used when the cardholder enters the payment information by using an SSL certificate obtained from a service organization-approved certificate authority. The merchant should also secure the connection used to transport the PARes message from the cardholder to the merchant plug-in by using an SSL certificate obtained from a service organization-approved certificate authority.

The channel between the cardholder and the ACS should be encrypted by the ACS by using an SSL certificate obtained from a service organization-approved certificate authority. This channel is used for two purposes. First to send the PAReq message from the merchant plug-in to the ACS, and secondly to send the signed PARes message from the ACS to the cardholder.

The channel between the cardholder and the enrollment server should be encrypted by the enrollment server using an SSL certificate obtained from a service organization-approved certificate authority. This channel is used to accept the cardholder enrollment information.

The channel between the merchant and the directory server, and between the directory server and the ACS server should be secured through a service organization-issued SSL encryption certificate in order to protect the PAN data contained in the VEReq and VERes messages and the ACS URL address contained in the VERes message.

The channel between the ACS to the cardholder should be encrypted to protect the prompt for the cardholder's password and the cardholder entered password. This channel should be protected with an SSL certificate obtained from a service organization-approved certificate authority.

For most transactions the Payment Authentication Request and Response messages include fields that include but are not limited to Message Version Number, Merchant Identifier, Merchant Country Code, Order Number, Purchase Date, Purchase Amount, Transaction Status, and Purchase Terms and Conditions. Also, the QueryCardholderRes Message typically includes fields such as but not limited to Message Version Number, Merchant Name, Order Number, Purchase Date, Purchase Amount, Card Expiration Date, and Transaction Stain. These messages can be in XML (Extensible Markup Language) format.

In non-purchase authentication transactions, the Payment Authentication Request, Payment Authentication Response, and QueryCardholderRes messages can include message extension fields. As is well known in the art, message extension fields are data fields that define additional elements with respect to the message to which the extension is attached. These additional elements can be used to further facilitate specific transactions, including non-payment transactions.

FIG. 8 illustrates an alternative view of a payment transaction using the core account authentication system. FIG. 8 is simplified by representing a simplified view of the transmitted messages. FIG. 8 will allow the reader to more easily understand the following two mobile embodiments of the invention. The two mobile embodiments that follow after FIG. 8 involve the account holder's use of Internet-compatible mobile devices and non-Internet compatible mobile devices.

The account authentication system architecture in FIG. 8 includes an issuer domain 102, an interoperability domain 104, and an acquirer domain 106. Issuer domain 102 includes cardholder 122, ACS 114, and issuer 1610. Cardholder 122 represents the human cardholder and the cardholder client device, for example, a computer terminal or a mobile phone. Issuer 1610 represents and card-issuing bank that is capable of issuing a payment card to the cardholder. Interoperability domain 104 includes a Visa directory 1612, which in this case is a directory that is controlled by Visa, an authentication history server 130, and Visanet 1616. Acquirer domain 106 includes a merchant 132, a merchant plug-in software module (MPI) 134, and the acquiring bank 1622.

The payment transaction of FIG. 8 is described through the directional arrows that are numbered 1-12. The payment transaction begins at step 1 when a shopper browses at a merchant website, adds items that he or she wishes to purchase to a shopping cart, and then finalizes the purchase. At this point, merchant 132 has the necessary data, which includes the primary account number (PAN), expiration date, and address information, to proceed with the payment transaction. The PAN should be provided to merchant 132 during the checkout process either by cardholder input or through a wallet function. The expiration date should be no earlier than the current month.

At step 2, MPI 134 sends the cardholder's primary account number (and user device information, if applicable) to Visa directory 1612 to check if the cardholder PAN is enrolled with the account authentication system. This process occurs after the final "buy" click confirmation from the cardholder during the merchant checkout process. After the "buy" click is made, the merchant's software invokes the Merchant Server Plug-in (MPI) 134 to format a Verify Enrollment Request (VEReq) message. MPI 134 determines if it currently has a secure connection with Visa directory server 1612. If a secure connection has not been established, MPI 134 establishes an SSL connection with Visa directory server 134. If the Visa directory server configuration indicates that merchant 132 has been issued an SSL client certificate, Visa directory server 1612 will require merchant 132 to present the SSL client certificate during the establishment of the SSL session. After the secure connection has been established, MPI 134 posts the VEReq message to Visa directory server 1612. It is noted that in various embodiments, the "buy" click confirmation can be completed using various purchase order confirmation processes.

At step 3, if Visa directory server 1612 determines that the PAN is in a participating card range, then Visa directory server 1612 queries an appropriate ACS, such as ACS 114, to determine whether authentication (or proof of authentication attempt) is available for the PAN. This process occurs after Visa directory server 1612 receives the VEReq message from MPI 134.

In order for Visa directory server 1612 to verify that the PAN is in a participating card range, Visa directory server 1612 validates the syntax of the VEReq message and returns an Error if validation fails. Visa directory server 1612 validates the VEReq message data to ensure that certain requirements are met. First, the Acquirer BIN should represent a participating acquirer. Secondly, the Merchant ID should represent a participating merchant of the Acquirer identified by Acquirer BIN. Thirdly, if the Visa region of the Acquirer requires a merchant password for the account authentication service, then a value for Password should have been received and the password should be valid for the combination of Acquirer BIN and Merchant ID. If any of these requirements are not met, then Visa directory server 1612 formats a Verify Enrollment Response (VERes) that includes a PAN Authentication Available set to "N" and an Invalid Request message. Note that this VERes does not contain the data fields of Account Identifier, ACS URL and Payment Protocols. After Visa directory server 1612 returns the VERes message to MPI 134, the payment transaction can proceed in a variety of manners. For instance, the payment transaction can come to a complete end, the payment transaction can proceed as a non-authenticated transaction, or the cardholder can attempt to use a different account number. These various manners will be described below in more detail.

Visa directory server 1612 searches for a record specifying a card range that includes the Cardholder PAN that was received in the VEReq message. If the Cardholder PAN is not found, then Visa directory server 1612 formats a Verify Enrollment Response (VERes) message that includes a PAN Authentication Available set to "N" and does not include the data fields of Account Identifier, ACS URL, Payment Protocols, and Invalid Request. Then Visa directory server 1612 returns the VERes message to MPI 134 and the account authentication again comes to a possible stopping point as will be described below.

Assuming the Cardholder PAN is found in Visa directory server 1612, Visa directory server 1612 determines whether it currently has a secure connection with an appropriate ACS. Visa directory server 1612 establishes an SSL connection with the ACS if a secure connection had not already been established. The SSL client certificate of Visa directory server 1612 and the server certificate of the ACS should be presented and validated during establishment of the SSL session. If the first URL attempted is not available, each successive URL value (if provided) will be attempted. Visa directory server 1612 can attempt to connect to up to four alternate URLs that are optionally configured for each ACS. If Visa directory server 1612 cannot connect with a URL on each of its attempts, Visa directory server 1612 formats a Verify Enrollment Response (VERes) message that includes PAN Authentication Available set to "N" but does not include the data fields of Account Identifier, ACS URL, Payment Protocols, or Invalid Request. Then Visa directory server 1612 returns the VERes message to MPI 134 and brings the account authentication process to a possible stopping point.

After a successful connection with a URL is made, Visa directory server 1612 removes the Password field from the VEReq message and forwards the message to the ACS URL.

At step 4, ACS 114 determines if authentication for the PAN is available and then indicates to Visa directory server 1612 the determination. This process occurs after the ACS receives the VEReq message via Visa directory server 1612. ACS 114 validates the syntax of the VEReq and returns an Error if validation fails. Note that when it is not possible to authenticate a payment transaction, it is sometimes possible to provide a proof of authentication attempt instead. ACS 114 uses the Cardholder PAN from the VEReq message and queries an Account Holder database located within ACS 114 to determine whether the cardholder is enrolled. If the PAN is not found, ACS 114 formats a Verify Enrollment Response (VERes) message including a PAN Authentication Available set to "N" and does not include the data fields of Account Identifier, ACS URL, Payment Protocols, and Invalid Request.

If Device Category is present, then ACS 114 cannot process transactions sent by the device category indicated. Alternatively, if ACS 114 does not recognize the device category value, the ACS formats a Verify Enrollment Response (VERes) message that includes a PAN Authentication Available set to "U" and does not include the data fields of Account Identifier, ACS URL, Payment Protocols, and Invalid Request.

If either Accept Headers or User Agent is present, then ACS 114 cannot process transactions sent by the cardholder device or the user agent indicated by the values of those elements. ACS 114 formats a VERes message that includes a PAN Authentication Available set to "U" and that does not include an Account Identifier, ACS URL, Payment Protocols, or Invalid Request. ACS 114 formats a Verify Enrollment Response (VERes) message that includes a PAN Authentication Available set to "Y" and an Account Identifier that the ACS internally associates with the PAN (note that this identifier may not be the PAN or any string useful to the ACS), the ACS URL to be used to transmit the PAReq message, and certain Payment Protocols. No Invalid Request is included in the VERes message.

ACS 114 then sends the VERes message to Visa directory server 1612.

At step 5, Visa directory server 1612 forwards the decision of ACS 114 to MPI 134. From the point of view of Visa directory server 1612, this process occurs after Visa directory server 1612 forwards the VEReq message to the ACS URL. From the point of view of ACS 114, this process occurs after ACS 114 sends the VERes message to Visa directory server 1612.

Visa directory server 1612 reads the VERes message, which contains the corresponding VERes or Error. Visa directory server 1612 validates the syntax of the VERes message and returns an Error to ACS 114 if validation fails. If the message received from the ACS is syntactically correct, Visa directory server 1612 forwards the VERes or Error to MPI 134. If the message received from ACS is not syntactically correct, Visa directory sever 1612 formats a Verify Enrollment Response (VERes) message that includes a PAN Authentication Available set to "N" and that does not include Account Identifier, ACS URL, Payment Protocols, or Invalid Request. Visa directory server 1612 returns the VERes message to MPI 132 and possibly stops the account authentication process. From the point of view of MPI 134, this process occurs immediately after MPI 134 posts the VEReq message to Visa directory server 1612. From the point of view of Visa directory server 1612, it occurs immediately after the Visa directory server forwards the VERes message to the MPI. MPI 134 reads the response, which contains the corresponding VERes or Error. If an Error message is received, the account authentication process possibly stops.

At the points at which the account authentication possibly comes to an end for the various reasons mentioned above, the merchant could proceed with a normal payment authorization using the available information from the checkout process. In this case, the merchant payment system must process the transaction as an unauthenticated electronic commerce transaction, which is out-of scope to this document. Note that the Electronic Commerce Indicator must be set to a value corresponding to the authentication results and the characteristics of the checkout process. If the merchant is unable to process an authenticated transaction using the account selected by the cardholder during the checkout process, the merchant can either abandon the transaction or give the customer the option of selecting an alternate account. If an alternate account is selected, the authentication process must be repeated.

In an alternative embodiment, the need to query the Visa directory server to verify an account holder's participation in the account authentication system for each payment transaction (steps 2-5) can be avoided by copying the contents of the Visa directory server into a local cache memory device at merchant 132. If this capability is used, merchant 132 can determine immediately from the cache if the account is part of an enrolled range. This alternative technique of using a local cache at merchant 132 begin with MPI 134 formatting a Card Range Request (CRReq) message and sending it to Visa directory server 1612. If this is the first time the cache is being loaded (or if the cache has been flushed and needs to be reloaded), a Serial Number element is not included in CRReq, which will result in Visa directory server 1612 returning the entire list of participating card ranges. Otherwise, MPI 134 should include the Serial Number from the most recently processed CRRes, which will result in the Visa directory server only returning the changes since the previous CRRes. A serial number is a value that defines the current state of a card range database at Visa directory server 1612. Visa directory server 1612 provides the serial number to MPI 134. The specific value is only meaningful to the specific Visa directory server that returns it.

Visa directory server 1612 validates the syntax of CRReq and returns an Error if validation fails. Visa directory server 1612 formats a Card Range Response (CRRes) containing the participating ranges and sends it to MPI 134. Visa directory server 1612 includes a serial number in the response. MPI 134 should retain this value to be included with the next day's CRReq message. MPI 134 validates the syntax of the CRRes and should send an Error to Visa directory server 1612 if validation fails. MPI 134 updates its local cache. The list must be processed in the order returned with ranges being added or deleted as indicated by the Action element. Note, that if CRRes indicates an error condition regarding the Serial Number, the MPI should clear its cache and submit the CRReq without a Serial Number.

When authentication is available for the cardholder's PAN, MPI 134 sends a Payer Authentication Request (PAReq) message to ACS 114 via cardholder client device at 122. Step 6 represents the PAReq message being sent to cardholder client device 122. This process occurs immediately after MPI 134 receives the VERes message from Visa directory server 1612. MPI 134 validates the syntax of the VERes and should send an Error to Visa directory server if validation fails. MPI 134 formats a Payer Authentication Request message (PAReq) that includes the Account Identifier received in VERes. MPI 134 deflates and Base64-encodes the PAReq message. The result is referred to as PaReq (note the case difference).

MPI 134 constructs a form containing the following fields: PaReq (note case), TermUrl, which is the merchant URL to which the final reply should be posted, and the MD ("Merchant Data") field. The MD field contains merchant state data that should be returned to the merchant. This field is used to accommodate the different ways merchant systems handle session state. If the merchant system can associate the final post with the original shopping session without any further assistance, the MD field may be empty. If the merchant system does not maintain state for a given shopping session, the MD can carry whatever data the merchant needs to continue the session. Since the content of this field varies by merchant implementation, the ACS must preserve it unchanged and without assumptions about its content. This field must contain only ASCII characters in the range 0x20 to 0x7E; if other data is needed, the field must be Base64 encoded. The size of the field (after Base64 encoding, if applicable) is limited to 1024 bytes. If MD includes confidential data (such as the PAN), it should be encrypted.

MPI 134 passes the PAReq through the cardholder browser to the ACS URL received in the VERes, by causing the cardholder browser to POST the form to the ACS. This is typically accomplished by using JavaScript. All connections are HTTPS to accommodate the cardholder browser.

Step 7 represents the Payer Authentication Request message being sent to ACS 114 from cardholder client device 122. This process occurs after ACS 114 receives the post including the PAReq from MPI 134. The following description applies to the case where cardholder authentication is performed using a password. Other methods, such as those that rely on applications on a chip card, may be used. The ACS Base64-decodes and inflates the PaReq field to obtain the PAReq (note the case difference). ACS 114 validates the syntax of the PAReq and returns an Error if validation fails. ACS 114 validates the PAReq data, ensuring that each of the following is true: 1) that ACS 114 is able to link the PAReq with a VERes in which the value of PAN Authentication Available was "Y"; 2) that the validation can take place through whatever mechanism ACS 114 chooses, such as by comparing the Account Identifier supplied in the two messages or by correlating the URL to which the message was posted to a customized ACS URL supplied in VERes; 3) that the Merchant Country Code is a valid ISO 3166 Country Code; 4) that the Purchase Currency is a valid ISO 4217 numeric currency code; and that 5) the Purchase Amount equals Display Amount. If any of these tests fails, then ACS 114 formats a Payer Authentication Response (PARes) message with Transaction Status set to "N" and an Invalid Request.

In step 8, ACS authenticates the cardholder using processes applicable to PAN. These processes include techniques such as but not limited to requesting a password or PIN that was previously established between issue 1610 and cardholder 122 and presenting a data challenge to the cardholder. A data challenge for instance, can involve ACS 114 requesting that cardholder client device 122 provide a specific data response that would authenticate the identity of cardholder or cardholder client device 122. In one scenario, an ACS 114 can request that a client cardholder device create a specific cryptogram that would authenticate cardholder 122. Alternatively, ACS 114 can produce a proof of authentication attempt. ACS 114 then formats a Payer Authentication Response (PARes) message with appropriate values and then applies a digital signature to the response message. ACS 114 validates the password, data response, or cryptogram against the account holder database located within the ACS.

At step 9, ACS 114 returns the Payer Authentication Response message to cardholder client device 122. At this point in time, ACS 114 can also send selected data to authentication history server 130. In order to return the PARes message, ACS 114 deflates and Base64-encodes the PARes message, the result of which is referred to as PaRes (note case difference). ACS 114 constructs a form containing a PaRes and an MD field. ACS 114 passes the signed PARes through the cardholder's browser to the merchant's URL (TermUrl in the post from the MPI) by causing the cardholder browser to POST the form to the MPI. In the process, the popup is closed and control is returned to the merchant's browser window. This is typically accomplished by using JavaScript. Also, ACS 114 formats a Payer Authentication Transaction (PATransReq) message that is sent to authentication history server 130.

At step 10, cardholder client device routes the Payer Authentication Response message to MPI 134. This process occurs after the Merchant Server Plug-in posts the PAReq to the ACS. MPI 134 reads the response, which contains the PaRes field (note the case difference). The MPI Base64-decodes and inflates the PaRes field to obtain the PARes or Error. MPI 134 validates the syntax of the PARes and should send an Error to the ACS (via the ACS URL received in the VERes) if validation fails.

At step 11, MPI 134 validates the digital signature placed on the Payer Authentication Response message by ACS 114. Validation of the digital signature can be performed by ACS 114 itself or by passing the Payer Authentication Response message to a separate validation server. The Validation Process validates the PARes signature using the Visa Root Certificate. If this is implemented using a separate Validation Server then MPI 134 sends the PARes to the Validation Process, the validation process validates the signature on the PARes using the Visa Root Certificate, and the validation process returns the result of signature validation to the MPI.

At step 12, merchant 132 proceeds with an authorization exchange with acquirer 1622.

Mobile Implementation: Internet Devices

This section describes the protocol changes required to support Internet-capable mobile devices within the account authentication system of the present invention. The design is intended to allow a mobile-enabled device to also support standard PC-based implementations and to co-exist and interoperate with standard account authentication implementations. The Internet-capable mobile devices include devices such as but not limited to wireless application protocol enabled phones, otherwise known as WAP phones.

Typically, account authentication for mobile Internet devices will use password-based authentication. However, other manners of authentication are also available. In a WAP environment, the connection between the mobile Internet device and the ACS and the connection between the device and the WAP Gateway can be secured by various security protocols, one of which is Wireless Transport Layer Security (WTLS). The connection between the gateway and the ACS can also be secured by various protocols, for example, with Secure Sockets Layer (SSL) or Transport Layer Security (TLS). This means that a password is encrypted on each side of the connection, but is (briefly) in the clear at the gateway. Gateways are usually implemented so that this translation occurs in a highly secure environment, which ensures that neither internal staff nor external intruders have access to secret information. Depending on the implementation chosen by the ACS (based on its cost vs. risk evaluation), the gateway may be implemented by the customer's wireless operator, or may be co-located with the ACS.

The account authentication system can be configured to run on standard browser platforms, however, future embodiments envision capabilities to run on various platforms.

Mobile Internet devices such as WAP phones present a challenge in that they provide a more limited computing and network environment. This constrains the account authentication protocol and dictates a slightly different user experience. Also, mobile Internet devices generally have a lower speed Internet connection than standard PCs, often 14,400 baud or lower. In addition, many gateways and mobile user agents have limits on the total amount of data they can handle per message. While there is no consistent standard to these limits—and they are expected to continue increasing—current limits typically fall in the range of 800 to 1200 bytes. Message size is therefore an important issue for the messages that must flow through the user agent or cardholder. Typically, the Payer Authentication Request (PAReq) and Payer Authentication Response (PARes) messages are very large and therefore difficult to transmit through most mobile Internet device browsers. The user experience is typically different in that the user interface and the display window are designed to a smaller scale and miniaturized to fit handheld devices.

With these obstacles in mind, several modifications to the account authentication process need to be made to incorporate mobile Internet devices into the account authentication system. These modifications focus on reducing the size of the PAReq and PARes messages by creating condensed versions of the messages called CPRQ and CPRS, respectively. One modification involves reducing the tag sizes for each of the messages. For instance, each of the headers and footers for each of the data fields cumulatively account for a large amount of data and therefore can be condensed to smaller versions.

In one embodiment, the PAReq and PARes messages are defined as XML messages, making them easily readable and easily extended. XML messages are made up of multiple elements that have identifying name tags. The tag names, however, make up a significant portion of each message. An aggravating factor is that each tag name appears twice, with brackets. A tag name of n characters adds a total of 2n+5 characters to the message. Therefore, for mobile Internet implementations of the account authentication system, the PAReq and PARes messages are replaced by: Condensed Payer Authentication Request (CPRQ) and Condensed Payer Authentication Response (CPRS). CPRQ and CPRS messages use tag names that are no more than two characters each, as compared to PAReq and PARes messages that use tag names that are up to 14 characters long.

A second modification involves excluding data in the PAReq and PARes messages that is not required for the authentication process. Also, data that can be recovered by the MPI, or from other information, need not be transmitted in the PARes because such data can be retrieved when needed. In one embodiment, data field exclusion is performed according to the following rules: 1) fields that are not required for the authentication of a payment transaction are excluded from PAReq to create CPRQ; and 2) all data elements that can be retrieved from the memory within the Merchant Server Plug-in (MPI) or from other information sources are excluded from the PARes to create CPRS.

Another modification involves selectively reducing the size of the data fields themselves. Both the merchant system and the ACS should minimize the amount of data included in fields of the CPRQ and CPRS where the contents are discretionary. This particularly applies to Merchant URL in the CPRQ and Vendor Code in the CPRS.

Yet another modification involves sending selected data directly from the Issuer to the MPI through the Internet. For instance, the digital certificate of the ACS can be sent through the VERes message during the process of verifying that the cardholder PAN can be authenticated using the authentication protocol. In this way, the digital certificate need not be passed through the CPRS message, which is transmitted through cardholder's mobile Internet device. The digital certificate can be placed in the extension field of the VERes message. In one embodiment, a specific element of the digital signature is sent through the VERes—the KeyInfo element. The KeyInfo element of the digital signature contains the Issuer signing certificate chain, which is a static element that does not vary for each transaction. Therefore, the KeyInfo element need not be sent as part of the CPRS. Instead, it is sent to the MPI within the VERes message. The MPI retains this data for subsequent use in reconstructing the PARes signature.

These methods are illustrated further in the following description of a payment transaction in FIG. 9.

Figure 9:
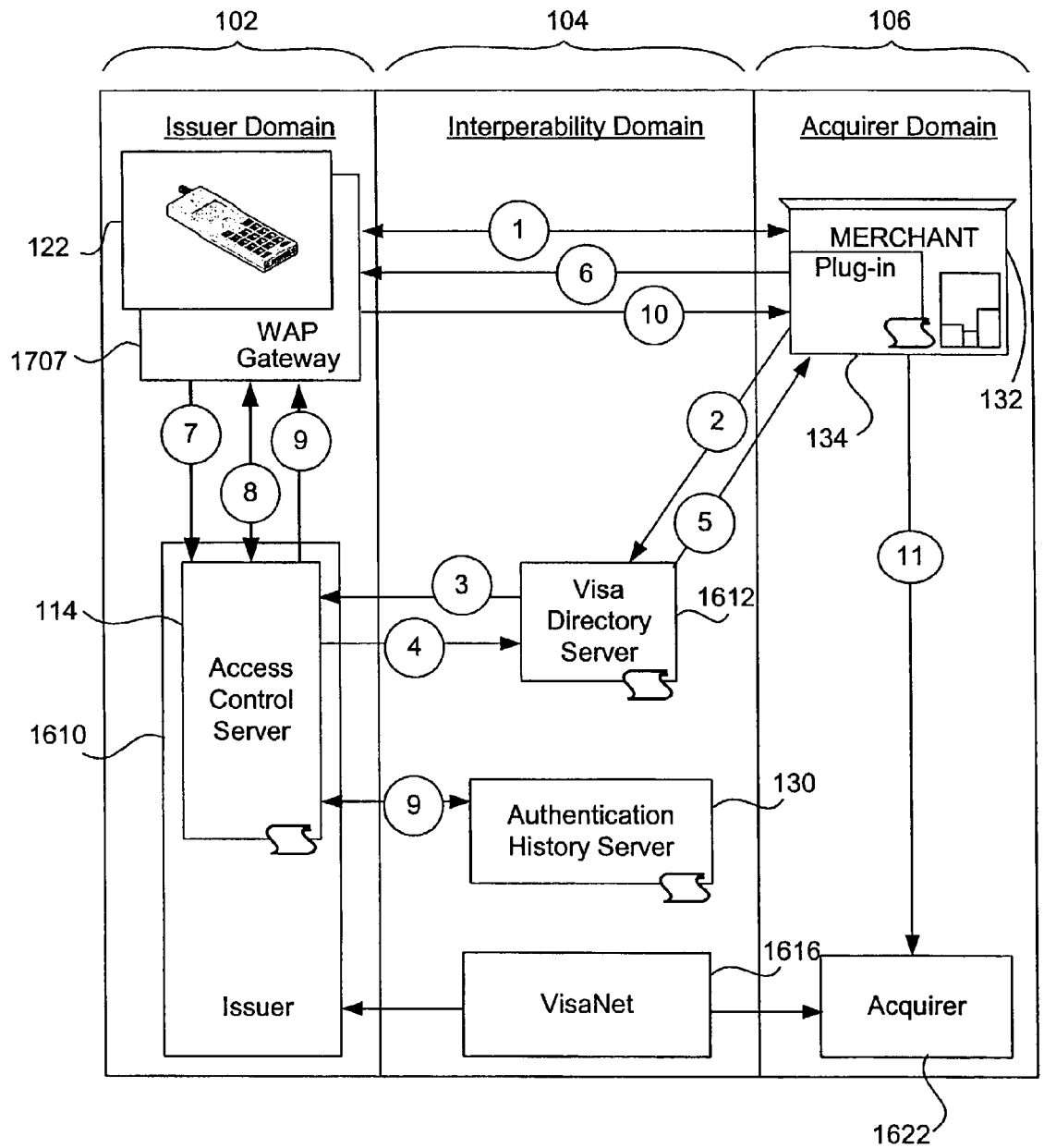
FIG. 9 illustrates an account authentication protocol superimposed over a system architecture for a mobile Internet device implementation of the present invention.

FIG. 9 illustrates an account authentication protocol superimposed over a system architecture for a mobile Internet device implementation of the present invention. The account authentication system architecture in FIG. 9 includes an issuer domain 102, an interoperability domain 104, and an acquirer domain 106. Issuer domain 102 includes cardholder 122, access control server (ACS) 114, and issuer 1610. Cardholder 122 represents the human cardholder and the cardholder client device, for example, a computer terminal. Cardholder 122 is connected to the outside entities, such as ACS 114 and the merchant, through a WAP Gateway 1707. Issuer 1610 represents and card-issuing bank that is capable of issuing a payment card to the cardholder. Interoperability domain 104 includes a Visa directory 1612, which in this case is a directory that is controlled by Visa, an authentication history server 130, and Visanet 1616. Acquirer domain 106 includes a merchant 132, a merchant plug-in software module (MPI) 134, and the acquiring bank 1622.

The payment transaction of FIG. 9 is described through the directional arrows that are numbered 1-11. The payment transaction begins at step 1 when account holder or cardholder shops and conducts any necessary dialogue with merchant 132 to determine the items to be purchased, and provides any necessary information in order to finalize purchase.

At step 2 MPI 134 sends a VEReq message to Visa directory server 1612. The VEReq message includes the account holder's primary account number (PAN), channel, and user device information to Visa directory server 1612. MPI 134 sends the user device information so that the ACS can determine if it is able to receive and send the condensed messages required for mobile Internet devices. Specifically, the Browser.deviceCategory field is set to 1 for mobile Internet devices.

At step 3, if the PAN is in a participating card range, Visa directory server 1612 queries an appropriate ACS to determine whether authentication is available for the specific PAN.

At step 4 ACS 114 responds to Visa directory server 1612 with a VERes message that indicates if the PAN is enrolled in the account authentication service and whether authentication can be performed based on the type of device that cardholder 1616 is using and the channel information. As described above, if authentication can be performed, an issuer digital certificate is included in a message extension field of the VERes message. An key for decrypting an encrypted message can also be included within the message extension field. This key (e.g., the KeyInfo element) can be used to unlock the PARes signature.

At step 5 Visa directory server 1612 forwards the ACS response to MPI 134.

At step 6 MPI 134 does not create a PAReq message, but instead creates a Condensed Payer Authentication Request (CPRQ) message and then sends the CPRQ to ACS 114 via cardholder's 122 device. See FIG. 10, which shows a table that includes the data fields that make up the Condensed Payer Authentication Request message according to one embodiment. As described above, in some embodiments, CPRQ only includes data fields that are required for the account authentication process.

An Order Description field is normally included in the PAReq to provide the ACS with additional data about the requested order that can be displayed to the cardholder during the authentication. This field is omitted from the CPRQ because it tends to include a long data string and mobile Internet devices usually have limited ability to display large amounts of text. Also, the Order Description filed is not required for authentication.

The Recurring Frequency (rf) and Recurring Expiry (er) data fields are optional, however, if one of these elements is included, both must be included. The Merchant URL field is optional in the Mobile Internet Device implementation. Merchants can minimize the size of the Merchant URL in order to facilitate transmission of the CPRQ. Although the Merchant URL is optional in this protocol extension, it is still required in the message sent to the authentication history server. If this data is not received in the CPRQ, the ACS should attempt to fill the Merchant URL field in the PATransReq with the contents of the HTTP_REFERRER header. If the browser does not provide that header, then Merchant URL must be included in PATransReq as an empty field.

In some embodiments, MPI 134 creates a compressed and modified version of CPRQ. One compression algorithm that can be used is the DEFLATE algorithm. The CPRQ message can be modified by encoding it in Base64 so that web browsers can more easily handle the message. The DEFLATE algorithm is described in RFC1951 and the resulting data stream shall be represented in the ZLIB compressed data format, as specified by RFC1950. The resulting data stream is also Base64-encoded. Therefore, in one embodiment, MPI 134 can deflate and Base64-encode the CPRQ message to create a C64Q message. MPI 134 also constructs a form containing three hidden fields: the C64Q (or the CPRQ), the TermURL, and the MD. MPI then redirects the user to the ACS (for example, using a standard WMLScript such as On Enter Forward or On Timer Forward). Then MPI 134 sends the form including the C64Q (or CPRQ) to ACS 114.

At step 7 ACS 114 receives the CPRQ or the C64Q message. Note that a full Payment Authentication Request Message is not recreated at ACS 114. At step 8 ACS 114 authenticates cardholder 122 using processes applicable to PAN and channel, formats the PARes message with appropriate values and then signs it as described previously.

At step 8, ACS 114 performs the identity authentication process.

Then ACS 114 first constructs a complete PARes, and then secondly constructs the CPRS. ACS 114 creates the Condensed Payer Authentication Response (CPRS) message based upon the values of the PARes message. See FIG. 11, which shows a table that includes the data fields that make up the Condensed Payer Authentication Response message according to one embodiment. In some embodiments, ACS 114 deflates and Base64-encodes the CPRS to create a C64S message. ACS 114 also constructs a form containing two hidden fields: C64S (or CPRS) and the MD field that was received in the CPRQ message. ACS 114 then redirects the user to the TermURL (for example, using a standard WMLScript such as On Enter Forward or On Timer Forward).

With the exception of the elements that are purposely excluded from CPRQ, any element that is included in the PARes should also be included in the CPRS, with the tag changed and no change to the contents. For example, if an optional field is included as an empty element in the PARes, it should also be included as an empty element with the modified tag in CPRS. The fields listed below are defined in the PARes but are excluded in the CPRS. These excluded fields include:

| Field Name | DTD Element |
|---|---|
| Acquirer BIN | Merchant.acqBIN |
| Merchant ID | Merchant.merID |
| Purchase Date & Time | Purchase.date |
| Purchase Amount | Purchase.purchAmount |
| Purchase Currency | Purchase.currency |
| Currency Exponent | Purchase.exponent |

Note that although these fields are not included in the CPRS, they are available to the memory of the MPI. The MPI included all of the CPRS fields in the CPRQ and so the MPI has this data available to use in reconstructing the PARes.

At step 9 ACS 114 returns CPRS or C64S and the form to MPI 114 via cardholder's 122 device. At the same time, ACS 114 sends data including a full version of the PARes to authentication history server 130. A complete PARes is sent to the authentication history server so that all the fields are available for dispute resolution and reporting.

At step 10 MPI 132 receives CPRS, retrieves data fields from the memory of MPI 134 in order to reconstruct a full PARes, validates its signature, then processes the remaining fields.

MPI 132 performs the following steps to reconstruct a PARes message from a CPRS message. MPI 132 retrieves from its own records the data fields that were excluded from the CPRS message. To ensure that the PARes created by the ACS exactly matches the one reconstructed by the MPI, the contents of the PARes elements that are excluded from the CPRS should be exactly as in the PAReq.

MPI 132 performs certain steps to validate the ACS signature. First it is noted that the PARes is a signed message, while the CPRS is not. Instead, the CPRS contains a SignatureValue element from the PARes digital signature, and omits the two other elements of this digital signature, SignedInfo and KeyInfo. To validate SignatureValue, the MPI reconstructs the PARes, using: 1) data provided in the CPRS; 2) retrieved data that was sent in the CPRQ; and 3) the KeyInfo element (which includes the Issuer signing certificate chain) retrieved from the VERes.

At step 11, merchant 132 proceeds with authorization exchange with its Acquirer.

As described earlier, the MD field includes information that describes the particular transaction or shopping session. The MD field accompanies the authentication request and response messages so that the merchant can associate the authentication response message with the original shopping session and restore state. The MD field sent with the CPRQ and subsequently returned with the CPRS should be kept as short as possible. Preferably, that this field should be empty so that another field such as Transaction Identifier can be used for state management.

Mobile Implementation: Non-Internet Capable Devices

The account authentication protocol of the present invention has been described so far as to focus upon "Internet shopping," where the cardholder is shopping using an Internet-enabled device, and the authentication takes place over the Internet. In the previous section, the protocol is described in an implementation where Internet-capable mobile Internet devices (in particular, WAP phones) are used to support the Internet shopping. However, both shopping and authentication can be performed using mobile phones with more limited capabilities. For example, devices that use two-way messaging under Short Message Service (SMS) or Unstructured Supplementary Services Data (USSD) can also be used with the present invention. Also, devices that used the standard voice channel, particular using an Interactive Voice Response (IVR) system, can also be used. In some embodiments, both the messaging channel and the voice channel can be simultaneously or interchangeably utilized during different phases of the authentication process. This section specifies the protocol changes required to support the use of SMS, USSD, or voice/IVR for shopping and authentication within the account authentication protocol of the present invention.

The account authentication protocol normally runs by sending HTML or WML based messages between the ACS and the MPI through the cardholder's device. These actions are accomplished by embedding the Payer Authentication Request and Response within HTML or WML forms, which are then exchanged by redirection of the cardholder's device browser. As a recap, these basic steps are recounted here: 1) the Merchant Server Plug-in (MPI) sends a request for payer authentication (PAReq) to the Issuer's ACS and receives a response (PARes), note that both of these messages are routed through the cardholder's device; 2) The cardholder and ACS can be connected to each other, thereby establishing a channel through which the ACS can conduct an authentication dialog with the cardholder; and 3) The cardholder can be reconnected to the merchant in order to complete the payment processing.

However, when the cardholder is using an access device that does not have Internet capability, and in particular does not use a Web browser, alternative mechanisms should be used to transfer the Payer Authentication Request and Response between the MPI and ACS, and to conduct the authentication dialog between the ACS and the cardholder.

These alternative mechanisms for incorporating the use of voice and messaging devices involve include the following. First, the MPI and ACS exchanging the Payer Authentication Request and Response messages (PAReq/PARes) directly over the Internet, rather than routing them through the cardholder's device. In one embodiment, to transmit PAReq and PARes directly between the MPI and ACS, the MPI constructs the HTML form containing the Payer Authentication Request (PAReq) and POSTs the form directly to the ACS. Then ACS constructs the form containing the response (PARes), and POSTs the form back to the MPI. Note that the MPI may have to wait a period of time to receive the PARes from the ACS. This is particularly the case when authentication is performed via SMS, which has inherent latency. In this implementation, SMS, USSD or IVR systems are utilized between the cardholder and the ACS and between the cardholder and the MPI, while the remaining transmissions are conducted over the Internet. And secondly, modifications to the PAReq, PARes, VEReq, and VERes messages are made.

FIG. 12 describes an exemplary payment transaction in which voice and messaging devices are utilized. After discussion of FIG. 12, further details regarding the modifications of the PAReq, PARes, VEReq, and VERes messages will be discussed.

FIG. 12 illustrates one view of a payment transaction superimposed over an account authentication system architecture in which non-Internet capable devices are incorporated. The account authentication system architecture in FIG. 12 includes an issuer domain 102, an interoperability domain 104, and an acquirer domain 106. Issuer domain 102 includes cardholder 122, ACS 114, and issuer 1610. Cardholder 122 represents the human cardholder and the cardholder client device, for example, a computer terminal. Issuer 1610 represents and card-issuing bank that is capable of issuing a payment card to the cardholder. Interoperability domain 104 includes a Visa directory 1612, which in this case is a directory that is controlled by Visa, an authentication history server 130, and Visanet 1616. Acquirer domain 106 includes a merchant 132, a merchant plug-in software module (MPI) 134, and the acquiring bank 1622.

At step 1 cardholder 122 establishes a voice or messaging channel with merchant 132. Then cardholder 122 can shop for products or services provided by merchant 132 by conducting a dialog with merchant 132 to determine the items to be purchased and providing the information required in order to finalize a purchase. Examples of such shopping excursions include ticketing and replenishment of prepaid airtime accounts. In one embodiment, the connection between cardholder 122 and merchant 132 is a two-way messaging channel. When shopping is conducted via two-way messaging, the cardholder does not have any permanent session established with the merchant. The cardholder's device, e.g., a phone, is available to receive other messages. Short messages may be used even when the phone is also in use for a voice call. This means that, after receiving the Payer Authentication Request (PAReq) from the MPI, the ACS may immediately initiate an authentication dialog with the cardholder over SMS, USSD, or voice.

In another embodiment, the connection between cardholder 122 and merchant 132 is a voice channel. For example, a customer may dial an interactive voice response unit (IVR) to initiate the replenishment of a pre-paid account. If the Issuer ACS plans to use the messaging channel for authentication, there will be no conflict with the merchant's use of the voice channel. Mobile phones will allow the Issuer to communicate with the cardholder using messaging while the voice call with the merchant is maintained. However, the ACS cannot use the voice channel for authentication unless the merchant ends the call with the cardholder before sending the PAReq. Thus, if the ACS plans to use the voice channel, it must determine that either: 1) shopping is occurring on the messaging channel, or 2) the MPI has indicated in the VEReq that the merchant is willing to end the call if the ACS needs the voice channel. If the ACS does not plan to use the voice channel and the ACS cannot conduct the authentication dialog using the messaging channel, it must indicate in the VERes that authentication is not available.

At step 2 MPI 134 sends a VEReq message to Visa directory server 1612. The VEReq message includes the cardholder's primary account number (PAN), channel, and user device information to Visa directory server 1612. In this process, VEReq and VERes contain information used to confirm the protocol to be used by the cardholder's device.

At step 3, if the PAN is in a participating card range, Visa directory server 1612 queries an appropriate ACS to determine whether authentication is available for the PAN.

At step 4 ACS responds to Visa directory server indicating whether the PAN is enrolled in the account authentication system and whether authentication can be performed based on cardholder's device and channel information.

At step 5 Visa directory server forwards ACS response (or its own) to MPI 134. If cardholder 122 is not enrolled in the account authentication system or if authentication is otherwise unavailable, the merchant, acquirer, or payment processor submits a traditional authorization request and processing ends.

At step 6, MPI creates the Payer Authentication Request (PAReq) and sends it directly to ACS through the Internet. Again, note that PAReq is not sent to the ACS via cardholder 122. The MPI acts as a client to establish a secure connection to the appropriate ACS URL. At step 7 ACS receives the Payer Authentication Request.

At step 8, ACS authenticates cardholder 122 using processes applicable to the PAN and the channel type, then formats the PARes message with appropriate values and digitally signs it. To do this, ACS needs to establish connection with cardholder after receiving PAReq from MPI. Specifically, ACS needs the phone number of cardholder to establish this connection. The phone number can be pre-registered with the ACS. Alternatively, the ACS can obtain the cardholder phone number through the Merchant, who in turn received the phone number from the cardholder. In an alternative implementation of the protocol, authenticating information such as a password can be sent from cardholder 122 to ACS, or from cardholder 122 to merchant 132, who then re-routes the password to ACS 114.

Both two-way messaging and voice channels can be used for authentication processing. When the two-way messaging channel is used for authentication, the Issuer sends one or more messages to the customer phone, which displays Issuer and transaction information, and asks for the customer's approval. The message may simply request that a password/PIN be entered, or may activate an application on the user's device, such as a SIM Toolkit application. The ACS may use a variety of authentication mechanisms over the messaging channel. This mechanisms include: 1) simple password/PIN; 2) encrypted password/PIN; 3) challenge/response using symmetric cryptography (such as a triple-DES MAC); 4) public key-based challenge/response mechanism (PKI); and 4) EMV cryptogram. If no application is available on the phone, a simple password-based authentication may be used.

It is noted that authentication using either the messaging or the voice channel can be used even if the cardholder is using an Internet connection through their PC as the channel for shopping. (Depending on the capabilities of the cardholder's phone and mobile operator, this may also be possible when the cardholder is shopping using a WAP browser.) In this case, the Payer Authentication Request and Response will be exchanged between the MPI and the ACS by redirection through the cardholder's browser. If the Issuer wishes to authenticate the cardholder using SMS/USSD or an IVR system, they may initiate the call when the request is received. The ACS may use a pre-registered phone number, or may use the Internet connection to the cardholder's PC to have the cardholder supply one.

Before implementing such an approach, the Issuer and ACS provider should consider issues related to latency, particular when planning to use SMS for authentication. The latency for the SMS may be long, and even if the browser connection with the cardholder is maintained for that period, it is probable that the merchant system will have "timed out" the transaction before the authentication can be completed.

At step 9 ACS returns PARes to MPI. ACS also selected data to authentication history server 130. When authentication is complete, the ACS returns the PARes to the MPI as follows. First, acting as a client, the ACS establishes a secure (HTTPS) connection to the appropriate URL. If the paResURL form field was provided, then the ACS connects to paResURL. Note that the proxy server provider will define the root certificate used by the proxy server to establish the TLS/SSL session. In the case of a proxy server in the interoperability domain, this will be the Visa root certificate. The proxy server should ensure that the response is forwarded to the TermUrl originally provided by the MPI with the PAReq. Otherwise, the ACS connects to TermUrl. The root certificate to be used for establishing the TLS/SSL session will have been provided as the TermURLRootCert in the HTML form that included the PAReq. As described above, the ACS constructs a form containing the MD and PaRes (note case), and POSTs the form over the established connection.

The TermURLRootCert field contains the root SSL certificate that the MPI will use when the ACS subsequently establishes the session for returning the PARes. The MPI should include this certificate in the HTML form that included the PAReq, along with the TermUrl. The certificate should be deflated and Base64-encoded in the same manner as the PARes. This field is required and will be used by ACS implementations that require explicit knowledge of the trusted SSL root certificates prior to establishing an SSL connection. When establishing the HTTPS session with the merchant server, the ACS may choose not to verify the MPI server certificate during session establishment. Alternatively, the ACS may choose to validate the server certificate using the root certificate previously provided by the MPI in the TermURLRootCert field. In some implementations, the ACS may maintain a cache of certificates for use in verifying the merchant server certificates. This would normally contain a set of commonly used commercial root certificates (just as a browser does). If the ACS uses this cache exclusively, in some cases it may not be able to establish the connection to the merchant server. If the ACS uses such a cache, then it will need to have a method of maintaining and updating the cache. It is recommended that the certificate received in the TermURLRootCert field be added to the cache for subsequent use.

At step 10 MPI receives Payer Authentication Response. At step 11, MPI validates Payer Authentication Response signature. At step 12, merchant proceeds with authorization exchange with its Acquirer.

Further description of the modifications to each of the PAReq, PARes, VEReq, and VERes messages will now be discussed. Modifications to these messages include adding new data fields. In one embodiment, these new fields are implemented as XML elements that are contained within Extension elements (extension fields). Some or all of the modifications are made to the messages depending upon the specific parameters of the account authentication system.

When the ACS has completed the authentication, it will return the PARes to the MPI. The merchant system then sends payment confirmation to the cardholder (by SMS, USSD, or other means, depending on the merchant's business practices).

The discussion of each message begins with the VEReq message. The MPI sends the Verify Enrollment Request (VEReq) in order to learn whether authentication is available from an ACS for a specific card number and through what channel authentication will take place. The VEReq message is modified so that the MPI can perform the following functions. First, the MPI should specify that either two-way messaging or voice is the shopping channel being used. This can be indicated by using additional values defined within a data field that specifies the type of device used by the cardholder. For instance, these additional values can be placed in the Browser.deviceCategory field, which is a standard field in the account authentication system. In one embodiment, the value of 2 designates two-way messaging (SMS or USSD) and the value of 3 designates voice channel.

Second, the MPI should indicate what kind of channel the PAReq and PARes messages are to be sent through. For message and voice authentication techniques a direct channel should be established and indicated. This indication can be included in an extension field to the VEReq message called paReqChannel. For instance, the values of "browser" and "direct" can be set within paReqChannel. The "browser" value indicates that the Payer Authentication Request/Response pair (PAReq/PARes or CPRS/CPRQ) is exchanged by redirection through the cardholder's browser. The "direct" value indicates that the PAReq/PARes messages are exchanged directly over the Internet. If the shopping channel is either two-way messaging or voice, then the "direct" value should be specified. If no instance of this field is included, then the value of "browser" can be assumed.

Third, the MPI should include a hash of the cardholder's phone number, which may help the ACS to determine whether or not authentication will be available. This indication can be included in an extension field to the VEReq message called ChphoneHash. The MPI can create a SHA-1 hash of the cardholder's phone number. The phone number being hashed should be in the same format defined for a CHphone Extension field in the PAReq message. The ACS may use this field, if necessary, to determine whether the cardholder is using a phone number already known to the ACS. In one embodiment, the CHphone field is 28 bytes, containing the Base64 encoding of the 20-byte hash.

Fourth, the MPI should indicate whether the merchant is willing to transfer use of the voice channel to the ACS. This indication can be included in an extension field called VoiceChanTransfer. This field is used by the MPI if the shopping channel is the voice channel. VoiceChanTransfer indicates to the ACS whether the merchant is able to transfer use of the voice channel to the Issuer, and by what method. For example, one technique for transferring use of the voice channel from the merchant to the issuer involves the merchant ending the call and thus allowing the Issuer system to call the cardholder's phone. The following exemplary values for VoiceChanTransfer include "none" and "endcall." "none" indicates that the merchant is not able to transfer the channel and it is not available for the Issuer's use. "endcall" indicates that the merchant is able to end the call. "none" is the default and is assumed if this element is not included in the message. If a value of "none" is received, and the ACS requires use of the voice channel, then the ACS must return a value of 'U' in PAN Authentication Available in the VERes message.

Fifth, the MPI should provide information about additional devices or device capabilities available to the cardholder, if required. This information can be included in an extension field called CHDevCap. This field can be used regional or local implementations of the account authentication system where the merchant system may be required to include additional information in the VEReq regarding devices or device capabilities available to the cardholder (in addition to those implicit in the shopping channel itself). If this information is required by the particular implementation, this element may be used by the MPI to provide it. If use of this field is not required for the implementation, the ACS may ignore the content of this field if present. The MPI may include as many instances of this field as are applicable. Some defined values for this field are: 1) DP=Digital land-line, or mobile phone which can generate DTMF tones; 2) SMS=Mobile phone or PDA with SMS support; and 3) USSD=Mobile phone or PDA with USSD support.

Modifications to the VERes message are now described. The VERes message can be extended to allow the ACS and the Visa directory server to handle additional data transmission. With respect to the ACS, the VERes message can be extended so that the ACS can respond to the extension fields added to the VEReq message. In one embodiment, VERes has the additional fields of paReqChannel and VoiceChanTransfer.

The PaReqChannel extension field is used when the MPI has offered one or more alternative channels for the exchange of the Payer Authentication Request/Response pair. The value of PaReqChannel in the VERes indicates the selected method for exchanging PAReq and PARes. The VERes may include only one instance of PaReqChannel. The PaReqChannel field should match the first supported channel listed in the VEReq. If Device Category in the VEReq indicates the two-way messaging or the voice channel, the "direct" channel must be selected for exchanging the PAReq/Res pair. If the ACS does not support any offered method, this field is not included in the response, and PAN Authentication Available should be set to "U".

The VoiceChanTransfer extension field is used by the ACS when the ACS wishes to use the voice channel for authentication and the MPI has indicated that the voice channel is being used for shopping. The ACS may include only one instance of this element in the VERes, and it should match an instance received in the VEReq. If the ACS requests that the merchant end the call (by sending a value of "endcall"), then the merchant should end the call with the cardholder prior to sending the PAReq. If the ACS does not include this element, or sends a value of "none", then no action is required on the part of the merchant.

With respect to the Visa directory server, the VERes message can be extended so that the Visa directory server can specify the use of a proxy server between the MPI and ACS during the PAReq/Res exchange. In one embodiment, this extension field is called the paReqURL field. This field specifies the URL of a proxy server to which the form containing the PAReq is to be posted. As will be discussed below, a proxy server can be used to permit the needed exchange of data while maintaining the security provided by system firewalls.

Modifications to the PAReq message are now described. The PAReq message can be extended to allow the MPI to provide the cardholder's phone number to the ACS. In one embodiment, an extension field of CHPhone can be used. PAReq can also be extended to indicate the date and time when the MPI will allow the transaction to time out of an account authentication process if no PARes has been received from the ACS. The date and time should be specified using Greenwich Mean Time. An optional extension field paReqExp can be used for this purpose.

The ACS may use the contents of the Chphone field to initiate the "push" authentication session with the cardholder. If either the messaging channel or the voice channel is being used for shopping, the merchant should supply this field if available. The Chphone field should contain the entire phone number, including the country code. The phone number should be included as a numeric string with no embedded spaces or other characters.

New form fields have been defined for the HTML form that is used to transport the PAReq message so as to allow the MPI to provide at least two additional types of data. First, a field, such as TermURLRootCert, provides the root SSL certificate that the MPI will use during the session in which the PARes is returned. Second, a field, such as ACSURL, provides the value of VERes.url to a proxy server (if used). Also, an additional form field, paResURL, can be used to allow the proxy server to provide a URL, which indicates the location to which the ACS should send the PARes message.

The MPI sends the PAReq message to the ACS according to the following three steps. First, acting as a client, the MPI establishes a secure (HTTPS) connection to the appropriate URL. If provided in the VERes, the paReqURL Extension field should be used. Otherwise, the ACS URL from VERes.url is used. Second, the MPI constructs an HTML form that contains MD, TermUrl, and PaReq (note case), plus two additional fields of TermURLRootCert and ACSURL, which contains the contents of VERes.url. Third, the MPI then POSTs the form over the established connection. If a proxy server receives the PAReq, the proxy server may add to the form a field named paResURL. paResURL contains the URL to which the PARes should be returned. Then the proxy server forwards the form to the ACS using the ACSURL from the HTML form that included the PAReq.

The ACS, upon receiving the PAReq (either directly from the MPI, or forwarded by the proxy server), initiates the authentication using the appropriate authentication channel. The ACS may use a pre-registered phone number, or it may use the phone number provided in the PAReq (if supplied in the CHphone Extension field and allowed by the Issuer's risk management policy).

Security Issues for Voice and Messaging Implementations

This protocol extension requires that the MPI be able to establish a connection with the ACS to POST the form containing the PAReq. Many firewalls restrict the ability to create such out-bound connections, and will often only permit connection to a specific list of known trusted IP addresses. The purpose of this restriction is to ensure that "Trojan horse"

software on the merchant system cannot open a connection to a fraudster's server and send sensitive data.

Two variations of the system architecture can be employed with respect to the security/firewall restrictions. One version of the architecture involves updating each firewall's list of known and trusted IP address. The other version of the architecture involves using trusted proxy servers. In a fully implemented account authentication system, there will be many possible ACS systems, and there will be no way to know in advance the IP addresses to which it will be necessary to connect. In order to accommodate the requirement to connect to large numbers of ACS systems, one or more trusted proxy servers can be established to simplify security procedures. The paReqURL Extension field returned to the MPI in the VERes will identify one of those trusted proxy servers. The proxy servers will enable the ACS to send the PARes back to the merchant, while ensuring that only connections back to these merchants are made. Merchant systems will be required to permit connections only to the defined IP addresses of those servers.

If a proxy server is used, the Visa directory server will ensure that the MPI sends the PAReq to the proxy server by putting the URL of the proxy server in the paReqURL Extension field of the VERes. The proxy server should ensure that the PARes is also posted back to this proxy server. (This may be done using the paResURL form field). The proxy server should ensure that the form containing the PARes is posted back to the TermUrl originally specified by the MPI when the PAReq was sent. No other connections should be established and no other data should be transmitted.

Figure 13:
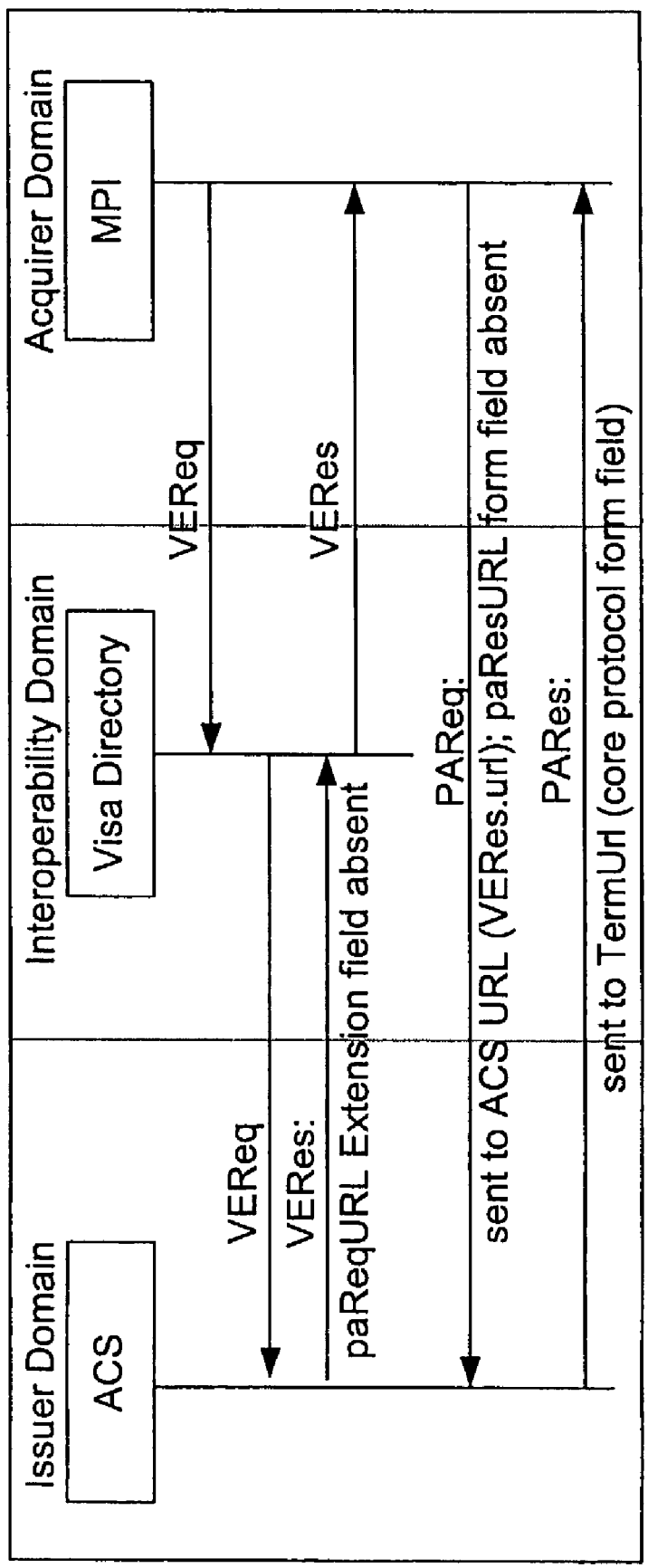
FIGS. 13 and 14 illustrate and contrast the basic message exchange for account authentication systems for the voice and messaging channels wherein FIG. 13 does not use proxy servers and FIG. 14 does use proxy servers.
Figure 14:
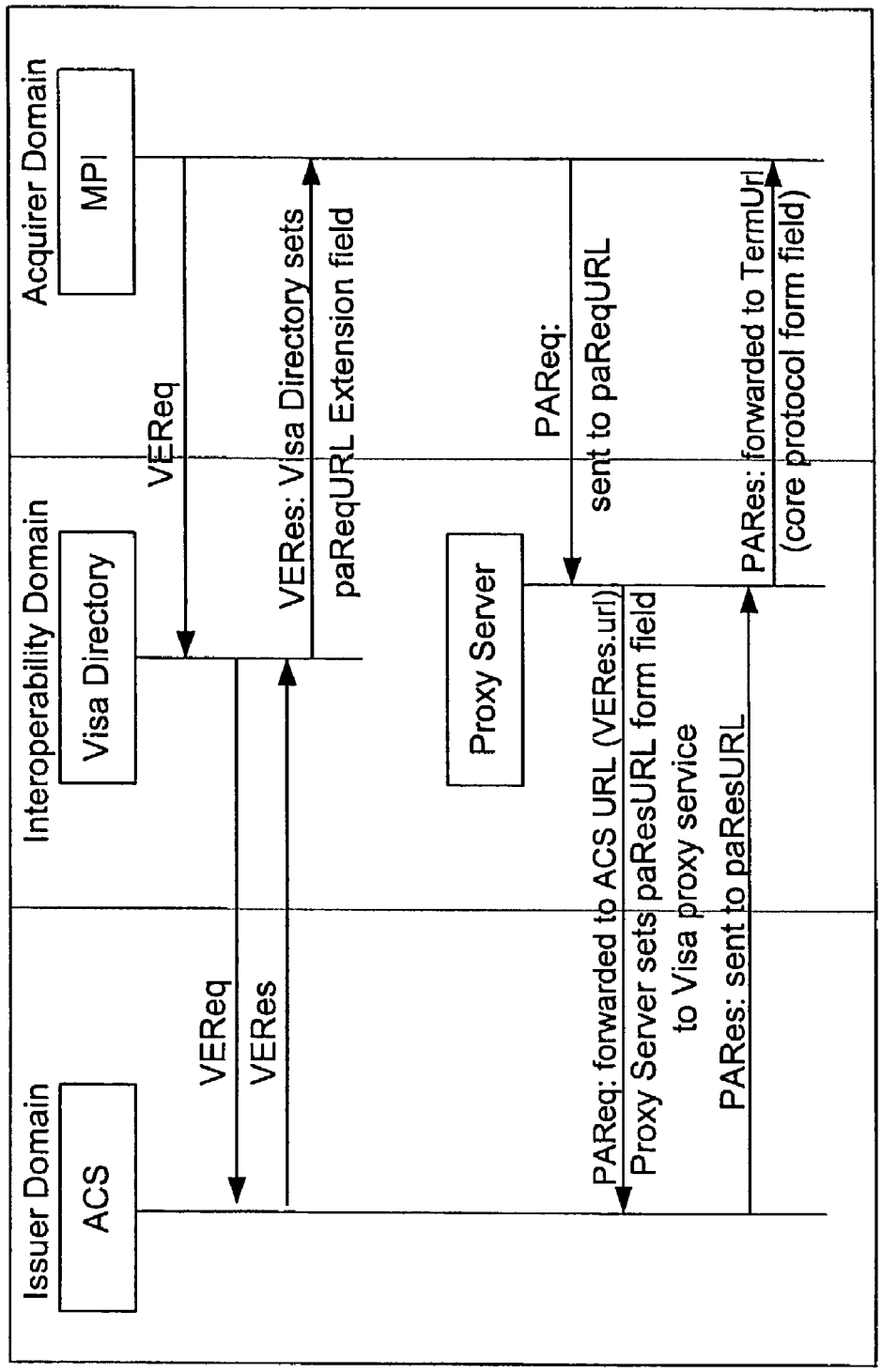

FIGS. 13 and 14 illustrate and contrast the basic message exchange for account authentication systems for the voice and messaging channels wherein FIG. 13 does not use proxy servers and FIG. 14 does use proxy servers. In each of FIGS. 13 and 14, the account authentication process proceeds from top to bottom and the message transmissions are shown using the directional arrows. The main difference is seen in FIG. 14 where PAReq and PARes are transmitted through a proxy server, rather than being transmitted directly between an ACS and an MPI.

Figure 15:
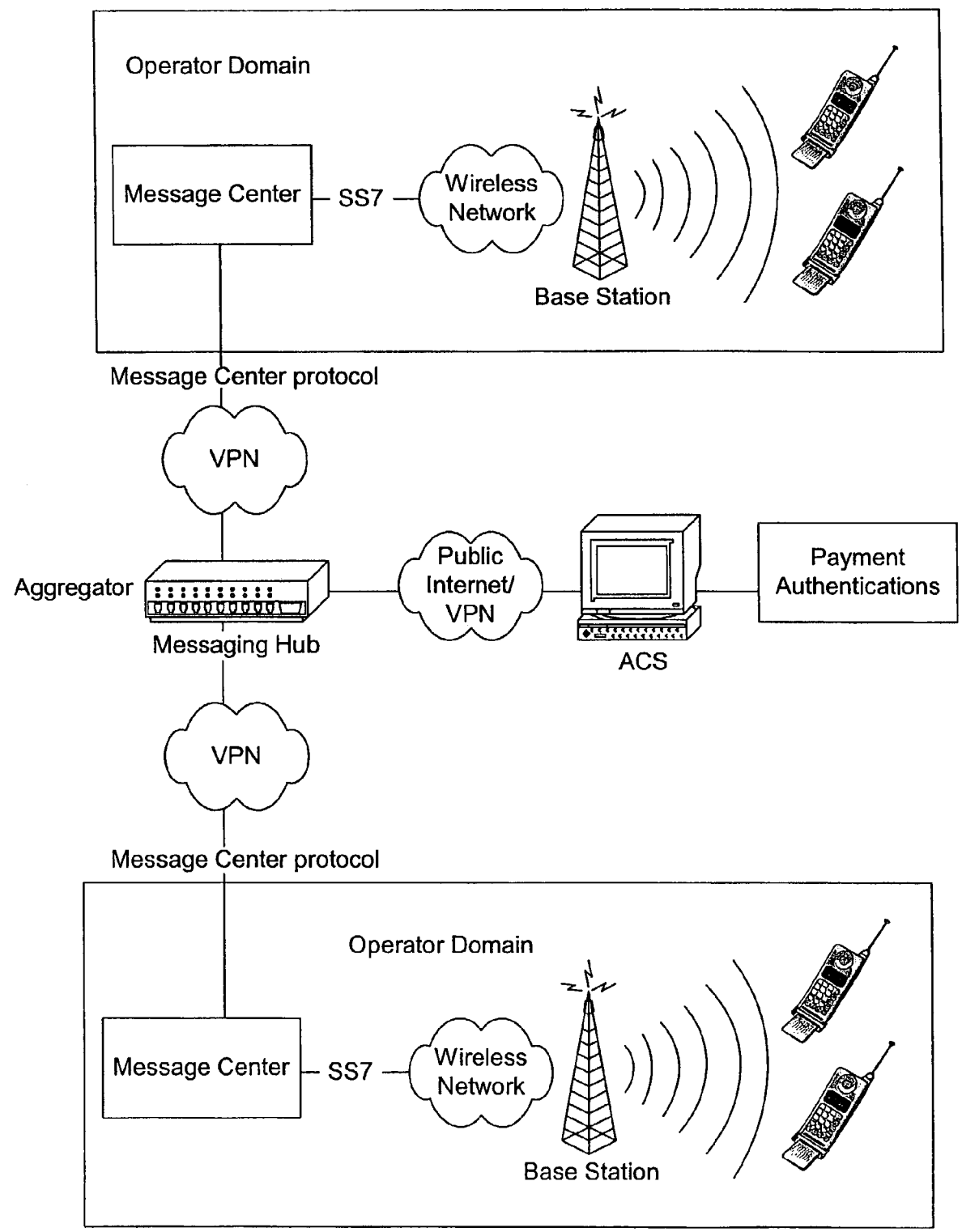
FIG. 15 illustrates a typical architecture that is used for two-way message processing.

FIG. 15 illustrates a typical architecture that is used for two-way message processing. The ACS should be able to send SMS or USSD messages to the cardholder giving information about the transaction, and requesting identifying data such as the cardholder password. The ACS should also be able to receive the response from the cardholder and associate it unambiguously with the request. The ACS developer may wish to develop this capability, or may wish to work with an aggregator that has the requisite capabilities and relationships with the relevant operators.

Regardless of what channel is used for authentication, the Issuer must be able to identify itself to the cardholder. In the "traditional" Internet channel, the Issuer can display a fairly large amount of information, including brand logos, and such things as the "Personal Assurance Message" (PAM4) defined at cardholder registration. When using two-way messaging, the PAM may also be used to provide some assurance of personal identity. However, a more robust method is required to ensure that cardholders know the service number (also sometimes known as a short code) that is used by the Issuer. This service number, which defines the origin of the incoming message, is provided by the mobile operator and cannot easily be modified or spoofed.

Preferred System Network

Figure 16:
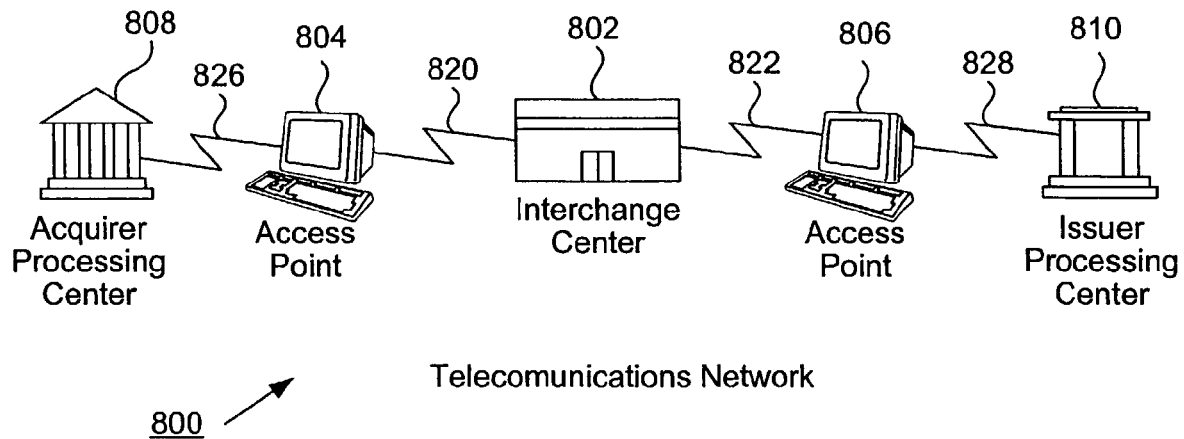
FIG. 16 illustrates a telecommunications network suitable for implementing an embodiment of the present invention.

FIG. 16 illustrates a telecommunications network 800 suitable for implementing an embodiment of the present invention. The present invention may make use of any suitable telecommunications network and may involve different hardware, different software and/or different protocols then those discussed below. The below-described network is a preferred embodiment of the telecommunications network 126 of FIG. 1. Network 800 is a global telecommunications network that supports purchase and cash transactions using any bankcard, travel and entertainment cards, and other private label and proprietary cards. The network also supports ATM transactions for other networks, transactions using paper checks, transactions using smart cards and transactions using other financial instruments.

These transactions are processed through the network's authorization, clearing and settlement services. Authorization is when an issuer approves or declines a sales transaction before a purchase is finalized or cash is dispersed. Clearing is when a transaction is delivered from an acquirer to an issuer for posting to the customer's account. Settlement is the process of calculating and determining the net financial position of each member for all transactions that are cleared. The actual exchange of funds is a separate process.

Transactions can be authorized, cleared and settled as either a dual message or a single message transaction. A dual message transaction is sent twice—the first time with only information needed for an authorization decision, an again later with additional information for clearing and settlement. A single message transaction is sent once for authorization and contains clearing and settlement information as well. Typically, authorization, clearing and settlement all occur on-line.

The main components of telecommunications network 800 are interchange centers 802, access points 804, 806 and processing centers 808 and 810. Other entities such as drawee banks and third party authorizing agents may also connect to the network through an access point. An interchange center is a data processing center that may be located anywhere in the world. In one embodiment, there are two in the United States and one each in the United Kingdom and in Japan. Each interchange center houses the computer system that performs the network transaction processing. The interchange center serves as the control point for the telecommunication facilities of the network, which comprise high speed leased lines or satellite connections based on IBM SNA protocol. Preferable, lines 820 and 822 that connect an interchange center to remote entities use dedicated high-bandwidth telephone circuits or satellite connections based on the IBM SNA-LU0 communication protocol. Messages are sent over these lines using any suitable implementation of the ISO 8583 standard.

An access point 804 or 806 is typically a small computer system located at a processing center that interfaces between the center's host computer and the interchange center. The access point facilitates the transmission of messages and files between the host and the interchange center supporting the authorization, clearing and settlement of transaction. Links 826 and 828 are typically local links within a center and use a proprietary message format as prefer by the center.

A data processing center (such as is located within an acquirer, issuer, or other entity) houses processing systems that support merchant and business locations and maintains customer data and billing systems. Preferably, each processing center is linked to one or two interchange centers. Processors are connected to the closest interchange, and if the network experiences interruptions, the network automatically routes transactions to a secondary interchange center. Each interchange center is also linked to all of the other interchange centers. This linking enables processing centers to communicate with each other through one or more interchange centers. Also, processing centers can access the networks of other programs through the interchange center. Further, the network ensures that all links have multiple backups. The connection from one point of the network to another is not usually a fixed link; instead, the interchange center chooses the best possible path at the time of any given transmission. Rerouting around any faulty link occurs automatically.

Figure 17:
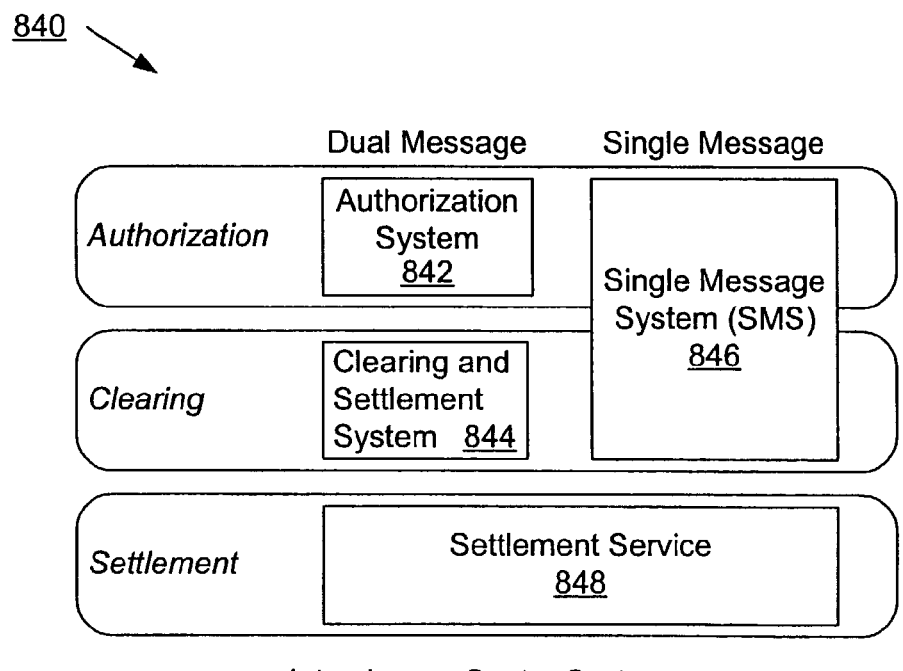
FIG. 17 illustrates systems housed within an interchange center to provide online and offline transaction processing.

FIG. 17 illustrates systems 840 housed within an interchange center to provide on-line and off-line transaction processing. For dual message transaction, authorization system 842 provides authorization. System 842 supports on-line and off-line functions, and its file includes internal systems tables, a customer database and a merchant central file. The on-line functions of system 842 support dual message authorization processing. This processing involves routing, cardholder and card verification and stand-in processing, and other functions such as file maintenance. Off-line functions including reporting, billing, and generating recovery bulletins. Reporting includes authorization reports, exception file and advice file reports, POS reports and billing reports. A bridge from system 842 to system 846 makes it possible for members using system 842 to communicate with members using system 846 and access the SMS gateways to outside networks.

Clearing and settlement system 844 clears and settles previously authorized dual message transactions. Operating six days a week on a global basis, system 844 collects financial and non-financial information and distributes reports between members. It also calculates fees, charges and settlement totals and produces reports to help with reconciliation. A bridge forms an interchange between system 844 processing centers and system 846 processing centers.

Single message system 846 processes full financial transactions. System 846 can also process dual message authorization and clearing transactions, and communicates with system 842 using a bridge and accesses outside networks as required. System 846 processes Visa, Plus Interlink and other card transactions. The SMS files comprise internal system tables that control system access and processing, and the cardholder database, which contains files of cardholder data used for PIN verification and stand-in processing authorization. System 846 on-line functions perform real-time cardholder transaction processing and exception processing for authorization as well as full financial transactions. System 846 also accumulates reconciliation and settlement totals. System 846 off-line functions process settlement and funds transfer requests and provide settlement and activities reporting. Settlement service 848 consolidates the settlement functions of system 844 and 846, including Interlink, into a single service for all products and services. Clearing continues to be performed separately by system 844 and system 846.

Figure 18:
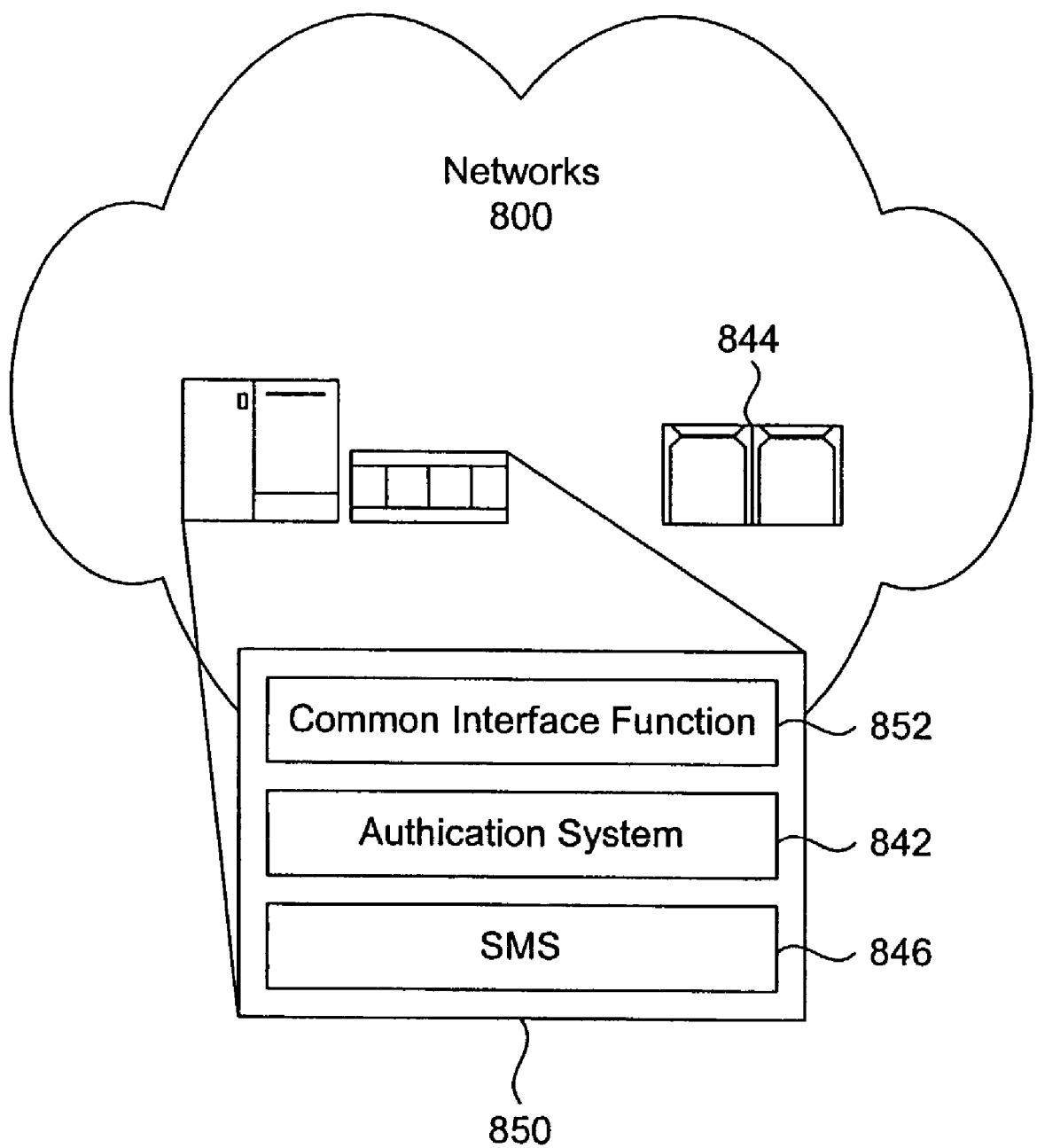
FIG. 18 illustrates another view of the components of the telecommunications network.

FIG. 18 illustrates another view of the components of telecommunications network 800. Integrated payment system 850 is the primary system for processing all on-line authorization and financial request transactions. System 850 reports both dual message and single message processing. In both cases, settlement occurs separately. The three main software components are the common interface function 852, authorization system 842 and single message system 846.

Common interface function 852 determines the processing required for each message received at an interchange center. It chooses the appropriate routing, based on the source of the message (system 842, 844 or 846), the type of processing request and the processing network. This component performs initial message editing, and, when necessary, parses the message and ensures that the content complies with basic message construction rules. Function 852 routes messages to their system 842 or system 846 destinations.

Computer System Embodiment

Figure 19A:
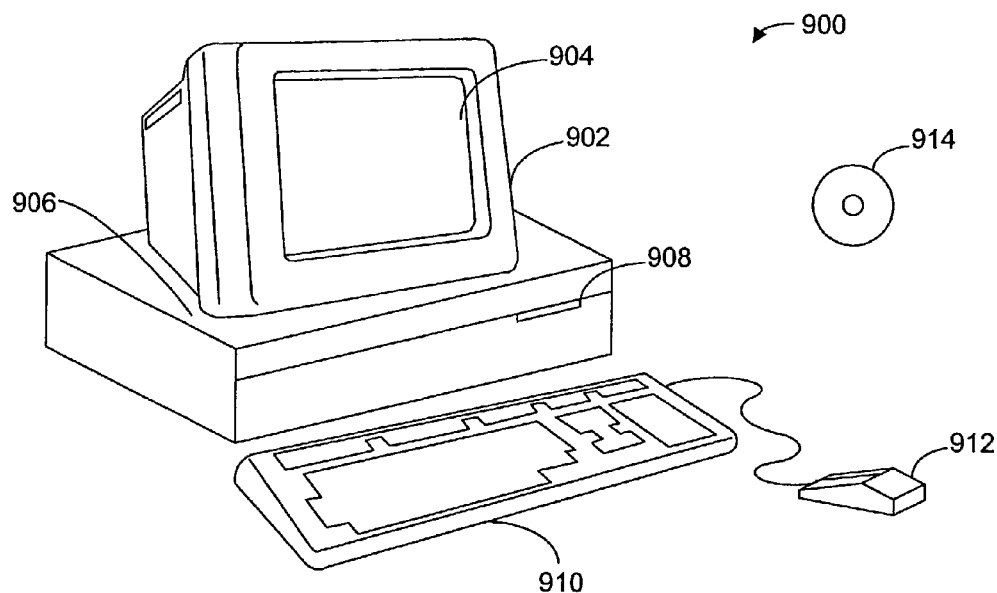
FIGS. 19A and 19B illustrate a computer system suitable for implementing embodiments of the present invention.
Figure 19B:
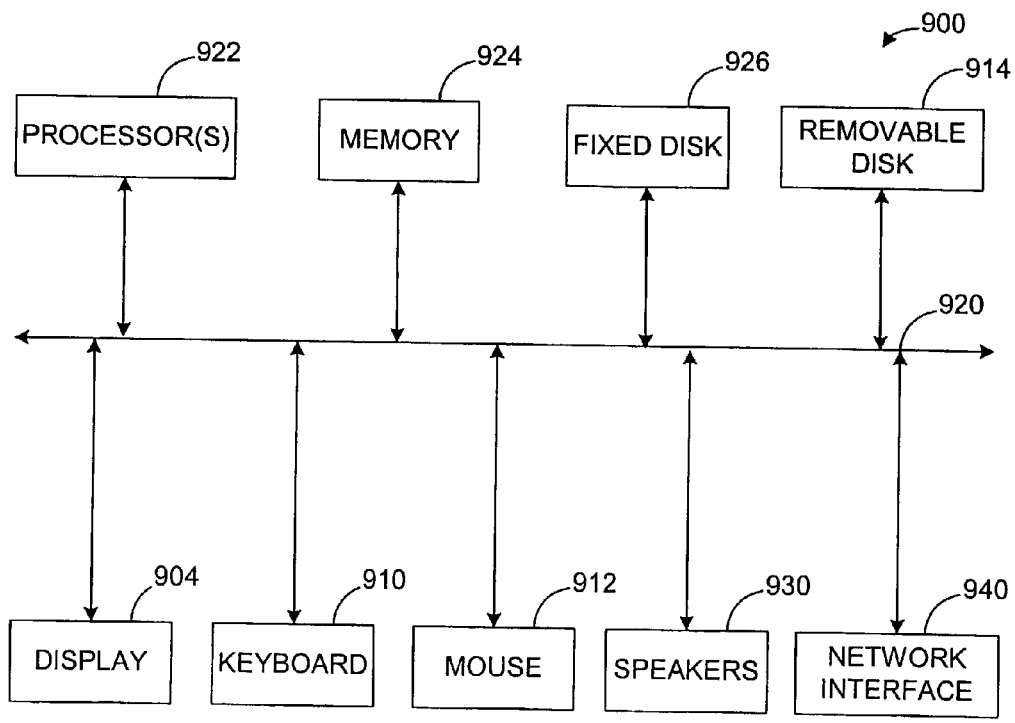

FIGS. 19A and 19B illustrate a computer system 900 suitable for implementing embodiments of the present invention. FIG. 19A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 19B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. A method by which a trusted party computer authenticates the identity of an account holder during a transaction between said account holder and a requesting party computer, said method comprising:
   establishing an online, Internet communication connection between said requesting party computer and an Internet-capable mobile device of said account holder in order to conduct said transaction;
   creating a condensed authentication request message at said requesting party computer;
   transmitting said condensed authentication request message to said trusted party computer via said mobile device of said account holder;
   verifying the identity of said account holder by said trusted party computer using an identity-authenticating token received from said account holder;
   creating a condensed authentication response message at said trusted party computer;
   transmitting said condensed authentication response message to said requesting party computer via said mobile device of said account holder; and
   validating, by said requesting party computer, that said condensed authentication response message indicates that the identity of said account holder is authenticated, whereby the identity of said account holder is authenticated by said trusted party computer for said requesting party computer.

2. A method as recited in claim 1 wherein said trusted party computer is operated by an issuer that maintains an account of said account holder, said method further comprising:
   verifying, by said issuer during a registration process, the identity of said account holder as the owner of said account and designating a registration token for said account; and
   comparing said received identity-authenticating token against said registration token previously designated for said account of said account holder, whereby said issuer verifies the identity of said account holder.

3. A method as recited in claim 1 wherein said identity-authenticating token is a password, a response to a question, a cryptogram or a value from a chip card.

4. A method as recited in claim 1 further comprising:
   transmitting a verification of enrollment request message from said requesting party computer to said trusted party computer wherein said verification of enrollment request message includes an account number of said account holder;
   determining, by said trusted party computer, if said account number of said account holder is contained within a list of enrolled account holders who are capable of being authenticated by said trusted party; and
   transmitting a verification of enrollment response message from said trusted party computer to said requesting party computer through the Internet wherein said verification of enrollment response message indicates if said account number is contained within said list of enrolled account holders.

5. A method as recited in claim 4 further comprising:
   including an extension field on said verification of enrollment response message that includes a chain of trusted party digital certificates.

6. A method as recited in claim 1 wherein each of said condensed messages are Internet-based messages that are made up of multiple elements that each have an element name tag, each element name tag having a first tag size, said method further comprising:
   replacing each of the element name tags with a respective shortened element name tag that has a second tag size, each of the second tag sizes being smaller than its respective first tag size.

7. A method as recited in claim 1 further comprising:
   reconstructing a complete authentication response message at said requesting party computer by combining said condensed authentication response message with data available at said requesting party computer; and
   validating a digital signature of said complete authentication response message to confirm that the identity of said account holder is authenticated.

8. A method as recited in claim 1 wherein said trusted party computer is operated by a financial institution.

9. A method as recited in claim 1 wherein said requesting party computer is operated by an online merchant, wherein said trusted party is operated by a financial institution, wherein said transaction is a financial transaction and wherein said account of said account holder is maintained by said financial institution.

10. A method as recited in claim 1 wherein said mobile device is a WAP telephone and communication between said mobile device and said trusted party computer utilizes a WAP gateway.

11. A method as recited in claim 1 wherein said step of verifying includes:
    contacting, by said trusted party computer, said mobile device of said account holder using a telephone number of said mobile device and establishing a text message channel or a voice channel; and
    receiving said identity-authenticating token from said mobile device over said text message channel or said voice channel, whereby said account holder provides authenticating information to said trusted party computer over a non-Internet connection.

12. A method as recited in claim 1 further comprising:
    redirecting an Internet browser of said Internet-capable mobile device from a web site of said requesting party computer to said trusted party computer, whereby said trusted party computer receives said identity-authenticating token from said account holder; and
    redirecting said Internet browser of said mobile device from said trusted party computer back to said web site of said requesting party trusted party computer.

13. A method as recited in claim 12 further comprising:
transmitting said condensed authentication request message and said condensed authentication response message by embedding said messages within markup language forms.

14. A method as recited in claim 1 further comprising:
performing said steps of transmitting and said step of verifying without the use of any additional software on said mobile device of said account holder relating to said method of authenticating.

15. A method as recited in claim 1 wherein said step of verifying further includes:
said trusted party trusted party computer contacting said account holder to obtain said identity-authenticating token using a messaging or a voice channel of said mobile device.

16. An account authentication system in which a trusted party authenticates the identity of an account holder with respect to an account during a transaction between said account holder and a requesting party, the system comprising:
an Internet-capable mobile device of said account holder;
a requesting party server configured to communicate online over the Internet with said mobile device of said account holder in order to process said transaction, said requesting party server further configured to create a condensed authentication request message and to transmit said request message to said trusted party via said mobile device;
an access control server controlled by said trusted party and configured to communicate over the Internet with said mobile device of said account holder, said access control server further configured to verify the identity of said account holder using an identity-authenticating token received from said account holder and to create a condensed authentication response message; and
a requesting party software module configured to receive said condensed authentication response message via said mobile device and to validate that said response message indicates that the identity of said account holder is authenticated.

17. An account authentication system as recited in claim 16 wherein said requesting party software module is further configured to reconstruct a complete authentication response message by combining said condensed authentication response message with data available at said requesting party and to validate a digital signature of said complete authentication response message to confirm that the identity of said account holder is authenticated.

18. An account authentication system as recited in claim 16 wherein said trusted party is an issuer that maintains an account of said account holder, wherein said access control server is further configured to verify during a registration process the identity of said account holder as the owner of said account and to designate a registration token for said account, and wherein said access control server is further configured to receive an identity-authenticating token from said account holder and to authenticate the identity of said account holder based upon a comparison of said registration token with said identity-authenticating token.

19. An account authentication system as recited in claim 16 further comprising:
a verification of enrollment response message that indicates if said account holder is enrolled in an authentication service; and
wherein said access control server is configured to transmit said verification of enrollment response message to said requesting party software module through the Internet.

20. A system as recited in claim 19 further wherein said verification of enrollment response message includes an extension field that includes a chain of trusted party digital certificates.

21. An account authentication system as recited in claim 16 wherein said identity-authenticating token is a password, a response to a question, a cryptogram or a value from a chip card.

22. An account authentication system as recited in claim 16 wherein said trusted party is a financial institution and maintains said account of said account holder.

23. An account authentication system as recited in claim 22 wherein said requesting party is an online merchant who conducts a financial transaction with said account holder.

24. A system as recited in claim 16 wherein said mobile device is a WAP telephone, said account authentication system further comprising:
a WAP gateway by which said mobile device and said trusted party computer communicate.

25. An account authentication system as recited in claim 16 wherein said Internet-capable mobile device of said account holder includes an Internet browser, said browser arranged to be redirected from said requesting party server to said access control server of said trusted party, whereby said trusted party receives said identity-authenticating token, said Internet browser being further arranged to be redirected from said access control server back to said requesting party server.

26. An account authentication system as recited in claim 25 wherein said condensed authentication request message and said condensed authentication response message are embedded within markup language forms.

27. An account authentication system as recited in claim 16 wherein said Internet-capable mobile device does not including any additional software relating to said account authentication system.

28. An account authentication system as recited in claim 16 wherein said access control server is further configured to receive said identity-authenticating token from said account holder using a messaging or a voice channel of said mobile device.

29. A method by which a trusted party computer authenticates the identity of an account holder during a transaction between said account holder and a requesting party computer, said method comprising:
conducting said transaction between a mobile telephone of said account holder and said requesting party computer over a first voice channel or by using a first two-way messaging service;
sending an authentication request message from said requesting party computer to said trusted party computer over the Internet, said request message not being routed through said mobile telephone;
establishing communication between said mobile telephone and said trusted party computer over a second voice channel or by using a second two-way messaging service;
transmitting an authenticating token from said account holder to said trusted party computer over said second voice channel or by using said second messaging service;
authenticating, by said trusted party computer, the identity of said account holder using said authenticating token; and
sending an authentication response message from said trusted party computer to said requesting party computer over the Internet, said response message not being routed through said mobile telephone; and validating, by said requesting party computer, that said authentication response message indicates that the identity of said account holder is authenticated, whereby said trusted party computer authenticates the identity of said account holder for said requesting party computer.

30. A method as recited in claim 29 wherein said trusted party computer is operated by an issuer that maintains an account of said account holder, said method further comprising:
    verifying, by said issuer during a registration process, the identity of said account holder as the owner of said account and designating a registration token for said account; and
    authenticating, by said trusted party computer, the identity of said account holder based upon a comparison of said registration token with said authenticating token.

31. A method as recited in claim 29 wherein said authenticating token is a password, a PIN, a response to a challenge, a cryptogram or a value from a chip card.

32. A method as recited in claim 29 wherein the operation of sending said authentication request message from said requesting party to said trusted party computer further comprises:
    constructing a first HTML form containing said authentication request message; and
    posting said first HTML form directly to said trusted party computer.

33. A method as recited in claim 32 wherein the operation of sending said authentication response message from said trusted party computer to said requesting party computer further comprises:
    constructing a second HTML form containing said authentication response message; and
    posting said second HTML form directly to said requesting party computer.

34. A method as recited in claim 29 wherein said conducting said transaction uses said first voice channel, wherein said establishing communication uses said second voice channel, said method further comprising:
    said requesting party computer ending use of said first voice channel before said trusted party computer establishes communication over said second voice channel.

35. A method as recited in claim 29 wherein said sending of authentication request mes sage includes
    sending said authentication request message from said requesting party computer to a proxy server; and
    forwarding said authentication request message from said proxy server to said access control server, whereby security of said requesting party computer is increased.

36. A method as recited in claim 35 wherein sending of authentication response message includes
    sending said authentication response message from said trusted party computer to said proxy server; and
    forwarding said authentication response message from said proxy server to said requesting party computer, whereby security of said trusted party computer is increased.

37. A method as recited in claim 29 wherein said first messaging service is SMS or uses USSD, and wherein said second messaging service is SMS or uses USSD.

38. A method as recited in claim 29 further comprising:
    creating a verification of enrollment request message that includes a query as to said trusted party computer's capability to authenticate the identity of said account holder and information regarding the communications protocol used by said mobile telephone of said account holder; and
    transmitting said verification of enrollment request message from said requesting party computer to said trusted party computer.

39. A method as recited in claim 38 further comprising:
    creating a verification of enrollment response message that indicates whether said trusted party computer has the capability to authenticate the identity of said account holder; and
    transmitting said verification of enrollment response message from said trusted party computer to said requesting party computer.

40. A method as recited in claim 29 further comprising:
    initiating an authorization process for said transaction when said authentication response message indicates that the identity of said account holder has been authenticated.

41. An account authentication system in which a trusted party authenticates the identity of an account holder during a transaction between said account holder and a requesting party, said system comprising:
    a mobile telephone of said account holder;
    a requesting party server configured to communicate with said account holder in order to process said transaction, said requesting party server further configured to transmit an authentication request message over the Internet to said trusted party;
    a first voice channel or first messaging service used between said requesting party server and said mobile telephone of said account holder to process said transaction;
    an access control server controlled by said trusted party, said access control server further configured to send an authentication response message to said requesting party over the Internet;
    a second voice channel or second messaging service used between said mobile telephone of said account holder and said access control server;
    an authenticating token that is transmitted from said account holder to said access control server over said second voice channel or second messaging service, said authenticating token configured to be used by said access control server to authenticate the identity of said account holder; and
    a requesting party software module configured to validate that said authentication response message indicates that the identity of said account holder is authenticated.

42. An account authentication system as recited in claim 41 wherein said authenticating token is a password, a PIN, a response to a challenge, a cryptogram or a value from a chip card.

43. An account authentication system as recited in claim 41 further comprising:
    a proxy server that routes said authentication request message and said authentication response message between said requesting party server and said access control server, whereby security is increased.

44. An account authentication system as recited in claim 43 further comprising:
    a verification of enrollment response message that indicates if said trusted party has the capability to authenticate the identity of said account holder, wherein said verification of enrollment response message is transmitted from said trusted party to said requesting party software module, and wherein said verification of enrollment response message includes an extension field that specifies the URL of said proxy server.

45. An account authentication system as recited in claim 41 wherein said trusted party is an issuer that maintains an account of said account holder, wherein said access control server is further configured to verify during a registration process the identity of said account holder as the owner of said account and to designate a registration token for said account, and wherein said access control server is further configured to authenticate the identity of said account holder based upon a comparison of said registration token with said authenticating token.

46. An account authentication system as recited in claim 41 wherein said first messaging service is SMS or uses USSD, and wherein said second messaging service is SMS or uses USSD.

47. An account authentication system as recited in claim 41 further comprising:
   a verification of enrollment request message that includes a query as to said trusted party's capability to authenticate the identity of said account holder and information regarding the communications protocol used by said mobile telephone of said account holder, wherein said verification of enrollment request message is transmitted from said requesting party server to said trusted party.

48. An account authentication system as recited in claim 47 wherein said verification of enrollment request message further includes an extension field that indicates if said authentication request message is to be sent to said access control server directly over the Internet or via said mobile telephone used by said account holder.

49. An account authentication system as recited in claim 47 wherein said verification of enrollment request message further includes a hash of said account holder's mobile telephone number, said access control server configured to use said hash to determine if the identity of said account holder can be authenticated.

50. An account authentication system as recited in claim 41 further comprising:
   a verification of enrollment response message that indicates if said trusted party has the capability to authenticate the identity of said account holder, wherein said verification of enrollment response message is transmitted from said trusted party to said requesting party over the Internet.

* * * * *